US006961084B1

United States Patent
Duncan et al.

(12) United States Patent
(10) Patent No.: US 6,961,084 B1
(45) Date of Patent: Nov. 1, 2005

(54) PROGRAMMABLE IMAGE TRANSFORM PROCESSOR

(75) Inventors: Kathleen A. Duncan, Santa Cruz, CA (US); Raymond S. Livingston, Bonny Doon, CA (US)

(73) Assignee: ESS Technology, Inc., Fremont, CA (US)

( * ) Notice: Subject to any disclaimer, the term of this patent is extended or adjusted under 35 U.S.C. 154(b) by 905 days.

(21) Appl. No.: 09/679,854

(22) Filed: Oct. 5, 2000

Related U.S. Application Data

(60) Provisional application No. 60/159,000, filed on Oct. 7, 1999.

(51) Int. Cl.[7] .......................... H04N 5/228; H04N 5/76; H04N 7/12; G06K 9/36
(52) U.S. Cl. .............................. 348/222.1; 348/231.99; 348/403.1; 375/240.19; 382/248
(58) Field of Search .......................... 348/221.1, 231.99, 348/403.1, 405.1; 375/246, 240.23, 240.19; 382/232, 246, 248

(56) References Cited

U.S. PATENT DOCUMENTS

| | | |
|---|---|---|
| 5,345,552 A | 9/1994 | Brown |
| 5,428,804 A | 6/1995 | Davies |
| 5,606,520 A | 2/1997 | Gove et al. |
| 5,669,010 A | 9/1997 | Duluk, Jr. |
| 5,701,450 A * | 12/1997 | Duncan ..................... 712/245 |
| 5,729,758 A | 3/1998 | Inoue et al. |
| 5,806,072 A | 9/1998 | Kuba et al. |
| 5,812,195 A * | 9/1998 | Zhang ................... 375/240.16 |
| 5,815,680 A | 9/1998 | Okumura et al. |
| 5,920,343 A * | 7/1999 | Watanabe et al. ........ 348/222.1 |
| 5,923,881 A | 7/1999 | Fujii et al. |
| 5,926,583 A | 7/1999 | Iwase et al. |
| 5,982,425 A * | 11/1999 | Allen et al. .............. 348/231.9 |
| 6,020,920 A | 2/2000 | Anderson |
| 6,020,982 A | 2/2000 | Yamauchi et al. |
| 6,072,936 A | 6/2000 | Koyama |
| 6,100,928 A * | 8/2000 | Hata ....................... 348/229.1 |
| 6,597,394 B1 * | 7/2003 | Duncan et al. .......... 348/222.1 |

* cited by examiner

*Primary Examiner*—Andrew Christensen
*Assistant Examiner*—Lin Ye
(74) *Attorney, Agent, or Firm*—Farjami & Farjami LLP

(57) ABSTRACT

A programmable image transform system has a programmable addressing and arithmetic blocks. In the programmable addressing block, an input address generator has an input addressing microsequencer and an input addressing memory that stores an input addressing procedure. The microsequencer executes the input addressing procedure to generate addresses from which to request image data. In the programmable arithmetic block, an arithmetic block memory stores an image processing procedure and a microsequencer executes the image processing procedure using the image data to generate transformed image data.

24 Claims, 25 Drawing Sheets

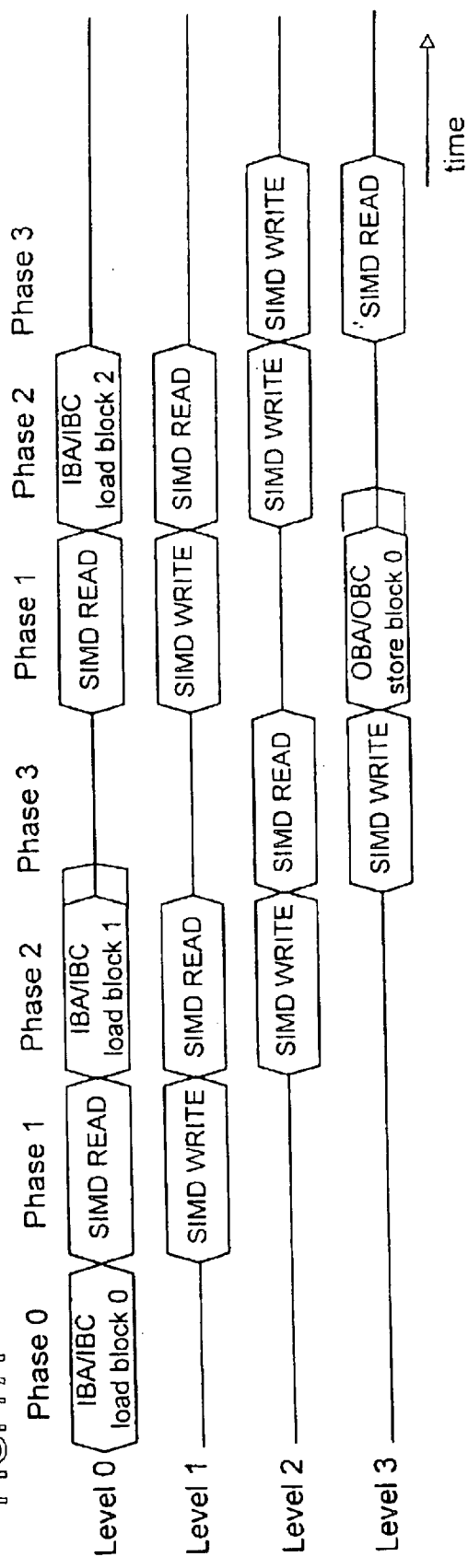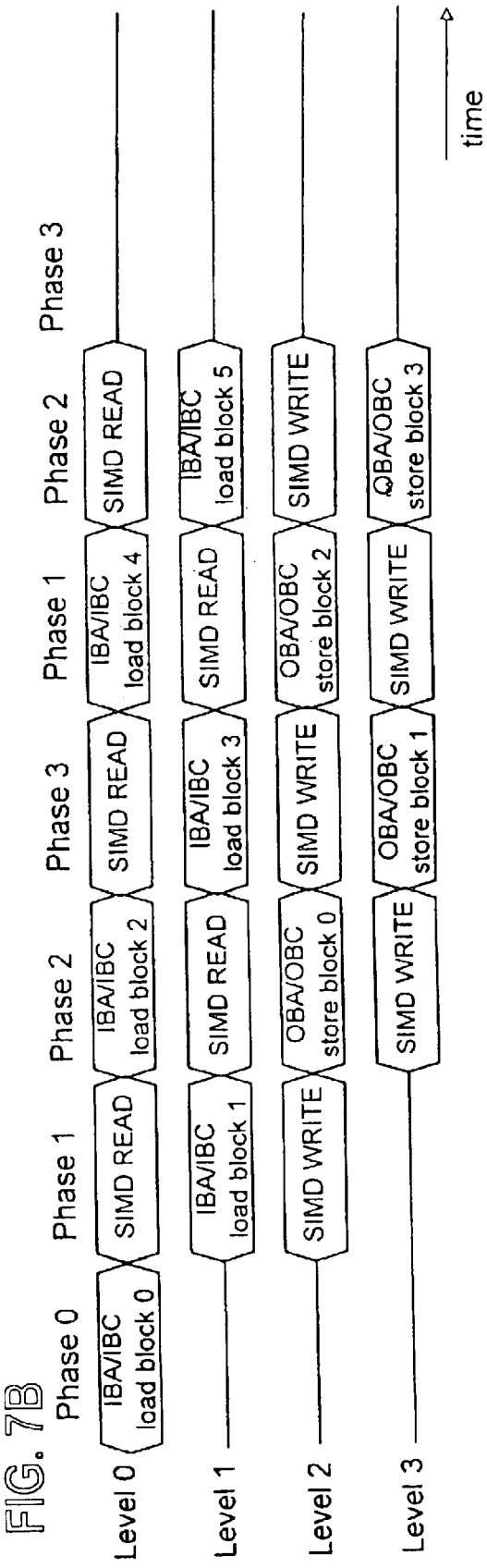

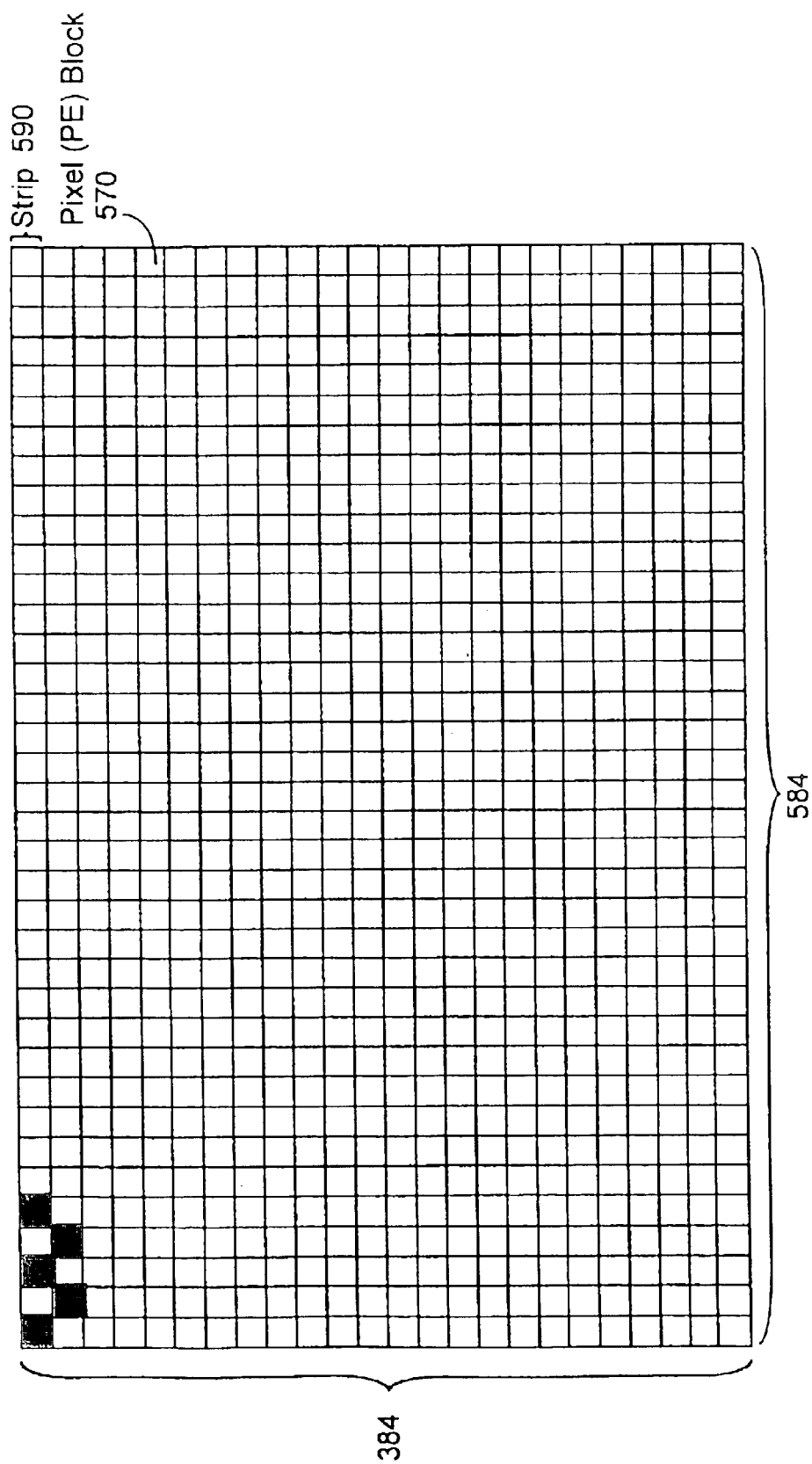

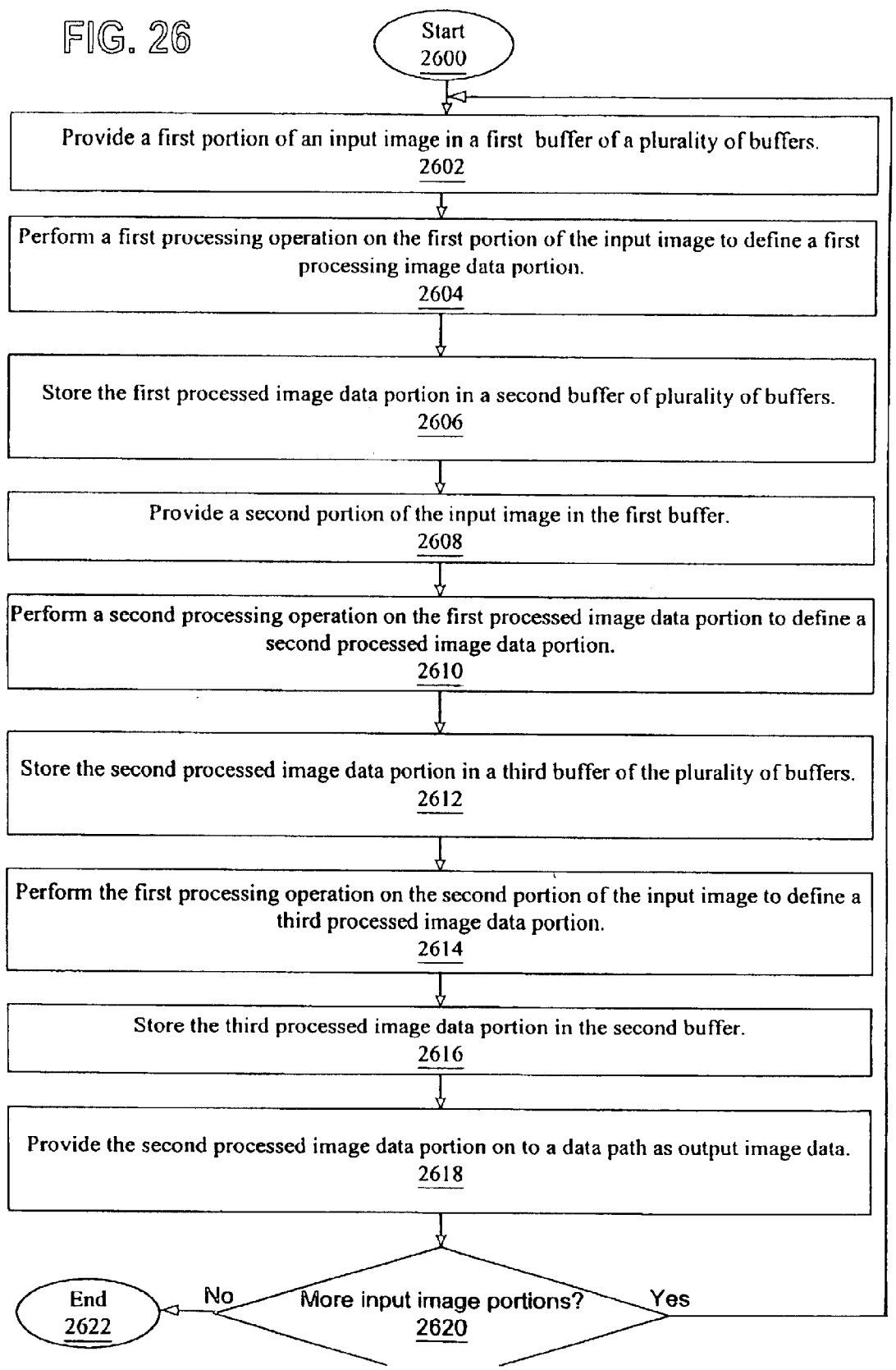

PROGRAMMABLE IMAGE TRANSFORM PROCESSOR

CROSS REFERENCE TO RELATED APPLICATIONS

This application claims the benefit of U.S. Provisional Application No. 60/159,000, entitled "Programmable Image Transform Processor," filed Oct. 7, 1999, that is incorporated by reference.

U.S. Patent application, titled "Programmable Image Transform Processor for a Digital Camera," Ser. No. 09/188,871, filed Nov. 9, 1998, incorporated by reference.

U.S. Patent application, titled "Programmable Timing Generator for a Digital Camera," Ser. No. 09/188,831, filed Nov. 9, 1998, is incorporated by reference.

U.S. Patent application, titled "Programmable Display Controller for a Digital Camera," Ser. No. 09/188,996, filed Nov. 9, 1998, is incorporated by reference.

BACKGROUND OF THE INVENTION

1. Technical Field

The invention relates generally to digital image processing, and particularly to a programmable image transform processor for digital image processing.

2. Related Art

In photographic cameras, the image-forming light is sensed and recorded directly on film. Unlike photographic cameras, the electronic still camera uses an electronic image sensor to sense the image-forming light and a separate recording medium to record and store the picture. Because the electronic still camera uses digital technology, the electronic still camera is a type of digital camera.

Typically the electronic image sensor in a digital camera is a solid-state device such as a charge-coupled device (CCD), charge injected device (CID) or a complimentary metal oxide semiconductor (CMOS) device. The image sensor connects to electronic interface circuitry which connects to a storage device and, optionally, to a display. A typical image sensor has many cells or pixels arranged along vertical and horizontal dimensions in a matrix. In response to light, the cells generate a charge or voltage which represents image information. The image sensor senses an image and stores image information, i.e., a charge or voltage, corresponding to the sensed light in the cells. Image sensors are made in many sizes such as, e.g., 400×300, 640×480, 1024×768 and 4096×4096 pixels. The image information stored in the cells is output serially from the image sensor using an arrangement of shift registers. The shift registers are arranged along vertical and horizontal dimensions and are coupled to the cells. The cells and shift registers require timing, or clock signals, having specific timing requirements, to output the image information. Each type of image sensor has its own unique timing requirements. Typically, a single image sensor requires many clock signals to control the flow of image information in both the horizontal and vertical dimensions. The clock signals must be synchronized. For example, to output image information from a 640×480 CCD requires 480 vertical shifts and 640 horizontal shifts for each vertical shift. Within a single dimension, the clock signals to control the flow of image information have different phases that must be synchronized. Furthermore, shifting the information out of the image sensor requires timing signals to synchronize the image sensor's operation with an analog signal processor (ASP) and an analog-to-digital (A/D) converter.

The image information sensed by each cell is also called a pixel. For example, a 640×480 CCD has about 307,200 pixels. After being converted to digital form, the image information (image data) is stored in a memory, typically an image memory. Image sensors having a larger numbers of cells produce higher quality images; however, the more pixel information that is available relates to the amount of processing and memory resources required to process the pixel information.

Typically, a digital signal processor processes the image data to improve the quality of the image. Various algorithms well-known in the art are used to improve the image quality of the image data. Because there is such a large amount of image data, the image data may be compressed before storage in a storage medium or memory.

Color imaging increases the complexity of processing the image data. In one method, the image sensor has a geometric arrangement of cells to respond to three colors, e.g., red, green and blue. Since each cell senses a particular color, various algorithms are used to interpolate the missing color information. Alternatively, two or more image sensors having different color sensitivity may be utilized and the image information combined.

In digital cameras, processing the data takes time. Analog image data from the image sensor is processed via the analog signal processor, converted into image data by the analog-to-digital converter and stored in memory. Furthermore, a digital signal processor processes the raw image data to improve the quality of the image. For color images that utilize a single image sensor, "missing" pixel data values must be interpolated and require even more processing time. Still images are further processed to compensate and correct for other errors introduced by the optical system and the image sensor. The compression of the image data adds even more time. The time required to acquire, process and compress the image data causes an unacceptable delay when acquiring consecutive images. The delay can take several seconds. This delay is a problem for photographers who need a continuous shooting capability to photograph a sequence of images in quick succession. Therefore a process and apparatus are needed to reduce the delay between consecutive pictures.

Typically, a digital camera has hardware that implements a single digital image processing procedure or algorithm. If the procedure is changed, the hardware must be redesigned, which is time consuming and expensive. Therefore, there is a need in the art for a digital image processing procedure or device that is easily and quickly modified and that supports numerous digital signal processing procedures using the same hardware. The digital image processing procedure or device should also minimize the processing time to allow consecutive pictures to be taken in quick succession.

In addition, depending on the environmental factors, such as lighting, the image processing algorithm should be selected or modified to produce the desired image quality. Furthermore, there is a need to dynamically modify the image processing algorithm during the image acquisition process.

As the size of the image sensors increases, the amount of image information to be processed increases. In addition, as image processing algorithms become increasingly sophisticated, complex processing of the image data consumes more time. Therefore, there is a need to reduce the image processing time.

SUMMARY

The programmable image transform system may be broadly conceptualized as a device that separates address generation from arithmetic manipulation, thus improving the overall efficiency of the device while reducing the time needed to perform image processing. For example, an image transform processor that processes digital images may utilize an architecture that includes a programmable arithmetic processor and a programmable input addresser. The programmable arithmetic processor may be capable of receiving digital image data from a memory, such as a read only memory (ROM), electronic erasable programmable read only memory (EEPROM), flash memory or non-volatile memory, over a data bus for processing. The programmable input addresser controls the transfer of image data from the memory to a programmable arithmetic processor. The programmable input addresser provides: (i) a memory address to a read address bus coupled between the programmable addresser and the memory, and (ii) a storage address to the programmable arithmetic processor. The memory address identifies a location of the digital image data within the memory. The storage address identifies a local buffer within the programmable arithmetic processor for storage of the digital image data.

The invention also relates to retrieval and storage of image data into a memory while other image data is being processed. The retrieved image data is placed in a set of local buffers. To increase the speed of image processing, a single-instruction multiple-data (SIMD) processor processes the image data in the set of local buffers and outputs the processed image data to another set of local buffers. For example, in an image transform processor having buffers, a first portion of input image data is provided in a first one of the buffers. A first processing operation is performed on the first portion of the input image data to define a first processed image data. The first processed image data is stored in a second buffer. A second processing operation is performed on the first processed image data to define a second processed image data. While the second processing operation is performed on the first processed image data, a second portion of the input image data is provided in the first buffer.

The invention also provides for using the image transform processor for processing video or other real-time data streams. The image transform processor has four buffer that are used for storing the video or real-time data. First and second levels of buffers are alternately used for fetching input data, while third and fourth levels of buffers are alternately used for storing output data. Thus, image data can be input, processed and output in every clock cycle.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon clearly illustrating the principles of the invention. Moreover, in the figures, like reference numerals designate corresponding parts throughout the different views.

FIGS. 7A and 7B are exemplary timing diagrams showing the overlapping of data retrieval, data processing, and data storage operations in the arithmetic processing block of FIGS. 4 and 6.

FIGS. 12A and 12B are examples of working blocks that include dispersed pixel blocks in the image data.

FIG. 26 is a flow diagram of an exemplary image transform process of the image transform processor of FIG. 4.

DETAILED DESCRIPTION OF THE PREFERRED EMBODIMENTS

Figure 1:
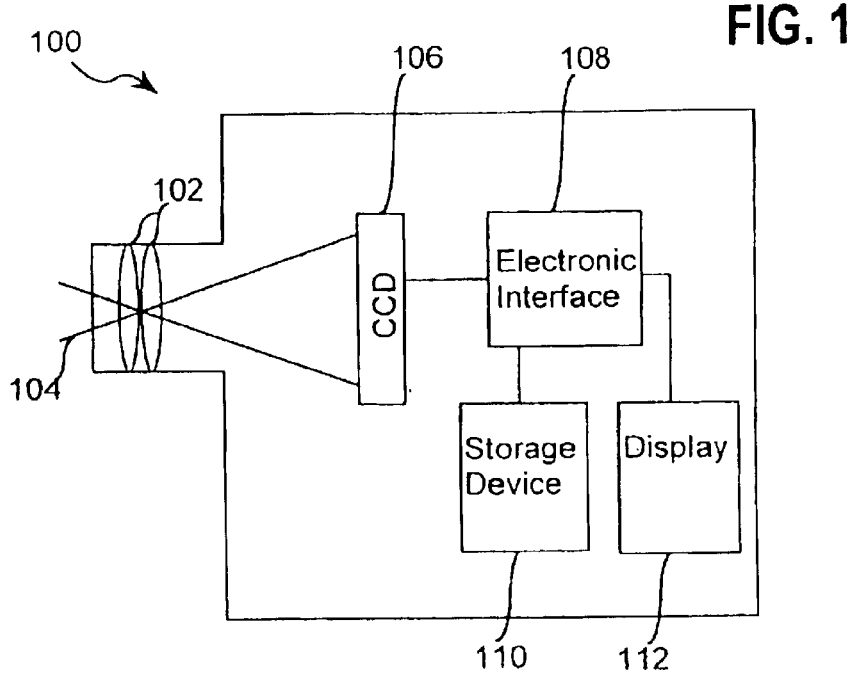
FIG. 1 is a block diagram of an electronic digital camera embodying an exemplary image transform processor.

In FIG. 1, a block diagram of a digital camera 100 embodying the image transform processor is shown. A lens 102 transmits the image-forming light 104 onto an electronic image sensor (image sensor) 106. The image sensor 106 is in the digital camera and located at the focal plane of the lens. The image sensor is typically a charge-coupled device (CCD) or a complementary metal-oxide-semiconductor (CMOS) sensor. Image sensors differ in the arrangement of the cells within the image sensor and the type of charge readout. The image sensor 106 connects to electronic interface circuitry 108. The electronic interface circuitry 108 also connects to a storage device 110 and an optional display 112. The electronic interface circuitry 108 controls the storage device 110 and stores the image sensed by the image sensor 106. The storage device 110 can include a tape drive, a disk drive, such as a floppy disk drive, hard disk drive, optical disk drive or magneto-optical disk drive, or an integrated circuit card with RAM, DRAM, or EEPROM, or non-volatile memory. The storage device 110 may be inside the digital camera 100 or attached to the digital camera externally. The electronic interface circuitry 108 may also control the display 112 that displays the image sensed by the image sensor 106. The display 112 can be inside the digital camera or attached to the camera externally. The electronic interface circuitry can operate the display 112 in either a viewfinder mode or a review (i.e., stored image viewing mode).

Figure 2:
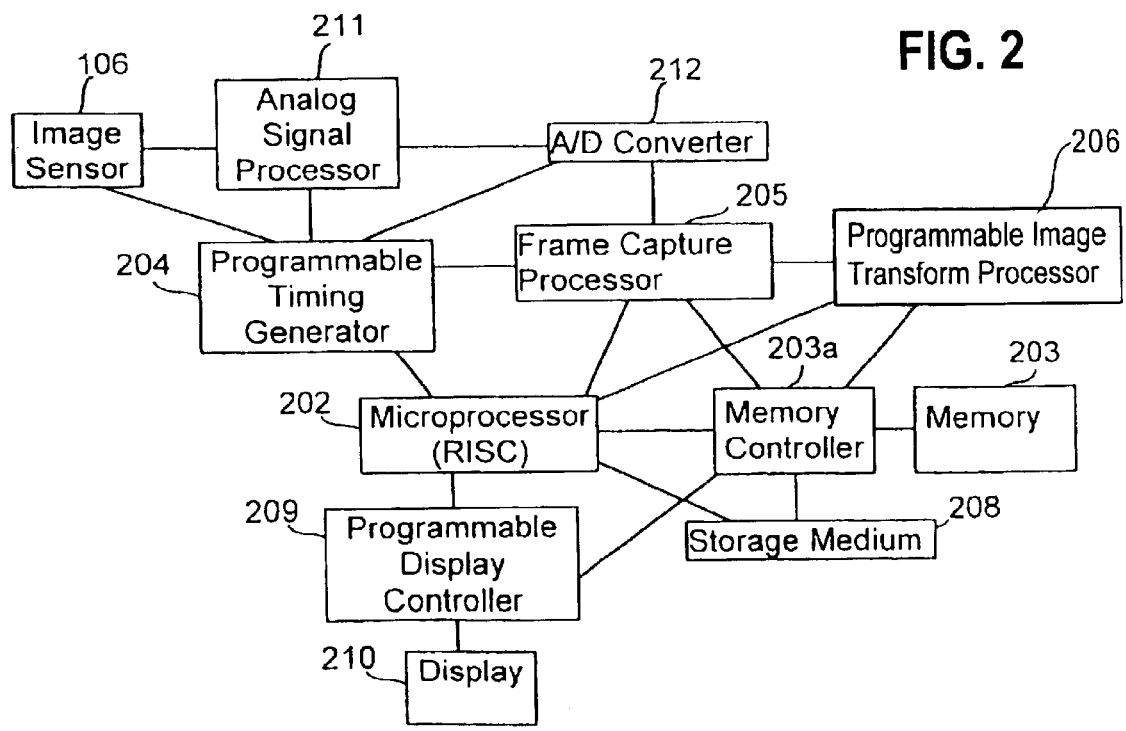
FIG. 2 is a block diagram of the digital camera of FIG. 1.

In FIG. 2, a block diagram of the electronic interface circuitry of the digital camera of FIG. 1 is shown. A microprocessor (RISC) 202 is coupled to a memory controller 203a, a programmable timing generator 204, a frame capture processor 205, a programmable image transform processor 206, a storage medium 208 and a programmable display controller 209. The memory controller 203a is connected to a memory 203. The programmable display controller 209 is coupled to a display 210. The image sensor 106 is coupled to an analog signal processor (ASP) 211 which connects to the analog to digital converter (A/D converter) 212. The programmable timing generator 204 is coupled to the image sensor 106, ASP 211, the A/D converter 212, the frame capture processor 205, and the microprocessor(RISC) 202. The programmable image transform processor 206 and other elements read data from and write data to the memory 203 via the memory controller 203a. Preferably, the memory 203 is a high-speed DRAM used to store the digital image data. The A/D converter 212 supplies digital image data to the programmable image transform processor 206 that stores the data in the memory 203. The timing generator 204 supplies timing signals to the programmable image transform processor 206 and A/D converter 212 to synchronize the transfer of digital image data between the A/D converter 212 and the frame capture processor 205. The frame capture processor 205 supplies the digital image data to the programmable image transform processor 206. Alternately, the frame capture processor 205 stores the image data from the sensor directly to the memory 203, and the programmable image transform processor 206 fetches that data from the memory 203 for further processing. The frame capture processor 205 supports real-time windowing, histogram, gamma, white balance and auto-focus functions.

The microprocessor(RISC) 202 executes a camera operation procedure that is stored in memory 203. Alternatively the camera operation procedure can be stored in a read-only-memory(ROM), or loaded into the memory 203 from the storage medium 208. Further, in alternate embodiments, the RISC microprocessor may be substituted a different type of controller, such as a typical microprocessor, digital signal processor, application specific integrated circuit (ASIC), phase array logic (PAL), discrete circuits functioning as a controller. The camera operation procedure comprises an image acquisition procedure. When a user presses a store-image button (not shown), the camera operation procedure causes the image sensor 106 to acquire an image. The image acquisition procedure causes the microprocessor (RISC) 202 to control the timing generator 204 to generate vertical and horizontal clock signals for use by the image sensor 106. The image sensor 106 outputs image as a series of analog signals corresponding to the color and intensity of the image sensed by each cell. The sensed image information is then sent to the ASP 211 and to the A/D converter 212.

The ASP 211 processes the sensed image information before input to the A/D converter 212. For example, the ASP has a programmable amplifier with adjustable gain, and also reduces or eliminates noise, such as reset noise, from the sensed image information using methods well known to those in the art, such as correlation-double-sampling.

The A/D converter 212 then converts the analog sensed image information into image data. In an alternative embodiment, the ASP 211 is absent and no pre-processing of the sensed image data occurs.

The image data is stored in memory 203. Execution of the camera operation procedure by the microprocessor (RISC) 202 causes the image data to be processed by the programmable image transform processor 206. The processed image data is compressed and recorded in memory 203, on a storage medium 208 or transferred to a programmable display controller 209 for output to a display 210.

Figure 3:
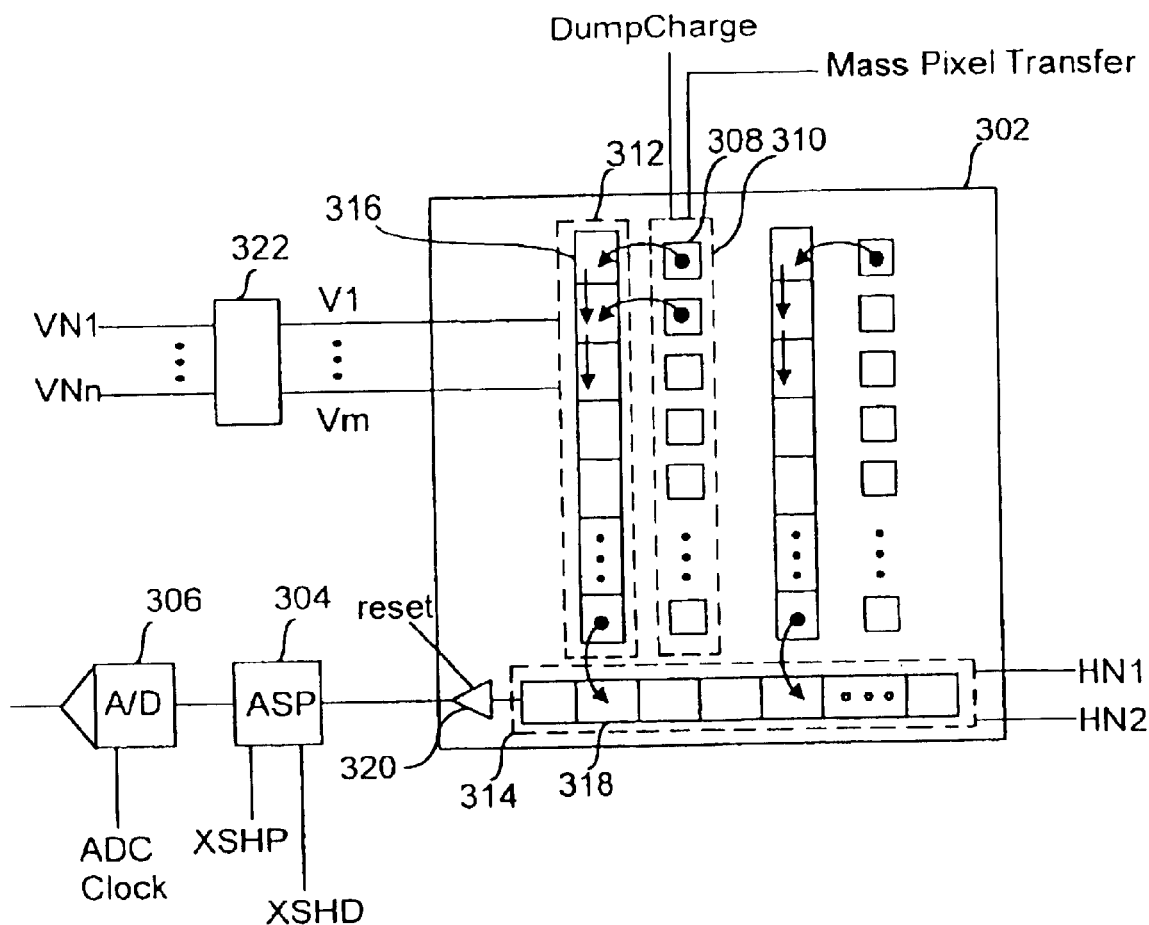
FIG. 3 is a diagram of an exemplary image sensor suitable for use with the image transform processor.

In FIG. 3, a block diagram of an exemplary image sensor 302 is shown. The image sensor 302 can be a CCD or CMOS device. The image sensor 302 connects to the analog signal processor(ASP) 304 and the A/D converter 306. The image sensor 302 has cells 308, vertical shift registers 312 and a horizontal shift register 314. Each cell 308 absorbs light and converts the light energy into an electrical charge. The amount of charge is a measure of the amount of light energy or radiation absorbed by the image sensor 302. The size of the image sensor 302 determines the quality of the image. The quality of the image improves as the number of cells 308 increases. Image sensors are available in many sizes including 400×300, 640×480, 1024×768, and 4096×4096 cells.

The components of the image sensor 302 are arranged along horizontal and vertical dimensions. An array 310 of cells 308 is arranged in the vertical dimension. The vertical shift register 312 has register location 316 for storing the charge sensed by the cells 308. Each cell 308 in the array of cells 310 connects to a corresponding register location 316 in the vertical shift register 312.

Free charges move from regions of higher potential to regions of lower potential. By alternating the voltage on the electrodes (not shown) connected to the cells 308 and the register locations 316 and 318 of the shift registers 312 and 314 in proper phase, a charge packet, i.e., the charge from the cell 308, can be moved from the cell 308 to a register location 316 in the shift register 312. The charge packet is then moved from one register location to another register location in the shift registers 312 and 318 until finally output by the image sensor 302.

When appropriate voltages are applied to the cell 308 and the corresponding register location 316 in the vertical shift register 312, the charge generated in the cell 308 is transferred out of the cell 308 to the corresponding register location 316 in the vertical shift register 312. The programmable timing generator is programmed to output timing or clock signals to cause the transfer of the charge to occur at synchronized times. When appropriate voltages are applied to adjacent elements of the vertical shift register 312, the charge is transferred from to the next registration location. The last element or output of each vertical shift register 312 connects to a corresponding register location 318 in the horizontal shift register 314. When appropriate voltages are applied to the last register location of the vertical shift register 312 and the corresponding register location 318 of the horizontal shift register 314, the charge is transferred from the vertical shift register 312 to the horizontal shift register 314. When appropriate voltages are applied to adjacent register location of the horizontal shift register 314, the charge is transferred from one register location to another register location until finally outputted. The output of the horizontal shift register 314 connects to the ASP 304 via an output amplifier 320.

Color imaging is more complex. In one method, the image sensor 302 has a geometric arrangement of cells to respond to three colors, e.g., red, green and blue. Alternatively, two or more image sensors having different color sensitivity are used. The programmable image transform processor of the present invention works with both methods of color imaging. The programmable image transform processor performs image transform operations on input data after it has been digitized by the A/D converter 306.

Figure 4:
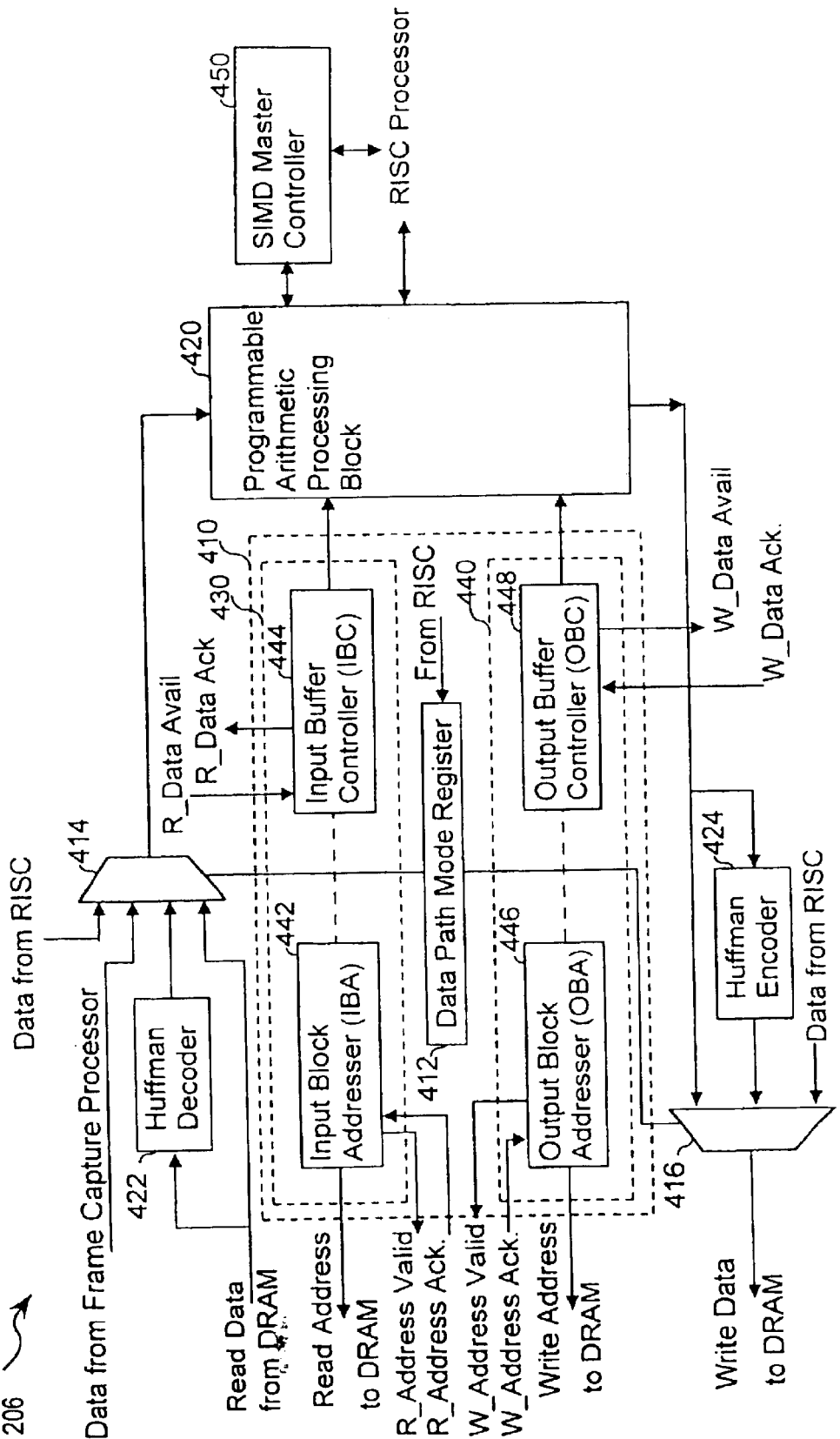
FIG. 4 is a block diagram of a preferred embodiment of the image transform processor of FIG. 2.

In FIG. 4, a block diagram of an embodiment of the programmable image transform processor (ITP) 206 of FIG. 2 is shown. Image transformation and compression operations, such as discrete wavelet transforms (DWT) and discrete cosine transforms (DCT) perform two main types of computation: address calculation and arithmetic computation. Devices such as digital cameras store images, at least temporarily, in solid-state memory such as a DRAM. The memory is organized into pages of image data. To acquire image data from the memory, an address is generated. After generating the address and acquiring the desired image data, the image data is further manipulated. The ITP 206 separates the address calculation from the arithmetic computation using parallel hardware. The ITP collects input image data and output image data in bursts when accessing the same memory page.

The ITP 206 has inputs and outputs for connecting to a read address bus, a read data bus, a write address bus, a write data bus and control signals. The ITP 206 connects to the memory, the A/D converter, the timing generator and the microprocessor (RISC). A DMA controller may be used to access the high speed image memory. The ITP 206 may a be dynamically configurable to provide many pipelined data processing paths. In an addressing block 410, a data path mode register 412 controls an input data multiplexor 414 and an output data multiplexor 416 to control the flow of image data to and from a programmable arithmetic processing block 420. The programmable arithmetic processing block 420 receives the image data, processes the image data and outputs the processed image data. The microprocessor (RISC) of the digital camera loads the data path mode register 412 with a specified data flow path information.

In response to the data flow path information being loaded in the data path mode register 412, the input data multiplexor 414 supplies data from the microprocessor (RISC), from a frame capture processor, a Huffman decoder 422, and directly from the DRAM. The frame capture processor provides an analysis of the image data as it is received from the programmable timing generator. The Huffman decoder 422 decodes compressed image data that was stored using the Joint Photographics Experts Group (JPEG) compression format in the external memory.

In response to the data in the data path mode register 412, the output data multiplexor 416 outputs data from the microprocessor (RISC), processed image data from the programmable arithmetic processing block 420, or encoded processed image data from a Huffman encoder 424. The Huffman encoder 424 compresses data from the programmable arithmetic processing block 420 using a JPEG compression format.

Table one, below, summarizes the data flow for various data path configuration settings of the data path mode bits of the data path mode register 412. In table one, the term "ITPBUF" refers to the programmable arithmetic processing block 420, and in particular to local buffers in the programmable arithmetic processing block 420.

TABLE 1

Data Path Configuration Settings

| Mode | Mode Bits | Data Flow | Buffer Owners PE = 0, IBC = 1, OBC = 2, RISC = 3 | | | |
|---|---|---|---|---|---|---|
| | | | L0 | L1 | L2 | L3 |
| Video | 000100 | FCP to ITPBUF to DRAM | 1/0 | 1/0 | 0/2 | 0/2 |
| Frame Blend | 000000 | DRAM to ITPBUF to DRAM | 1/0 | 1/0 | 0/2 | 0/2 |
| Process | 000000 | DRAM to ITPBUF to DRAM | 1/0 | 0 | 0 | 0/2 |
| Process/Encode | 000001 | DRAM to ITPBUF to HUFF to DRAM | 1/0 | 0 | 0 | 0/2 |
| Decode/Process | 000010 | DRAM to ITPBUF to HUFF to DRAM | 1/0 | 0 | 0 | 0/2 |
| RISC/RISC | 111000 | RISC to ITPBUF to RISC | 3 | 3 | 3 | 3 |
| RISC replace IBA | 010000 | DRAM to ITPBUF to RISC to DRAM | 3/0 | 0 | 0 | 0/3 |
| RISC Replace OBA | 001000 | DRAM to RISC to ITPBUF to DRAM | 3/0 | 0 | 0 | 0/3 |
| RISC replace IBA, OBA | 011000 | DRAM to RISC to ITPBUF to RISC to DRAM | 1/0 | 0 | 0 | 0/3 |
| IBA help RISC | 101000 | DRAM to ITPBUF to DRAM | 3 | 3 | 3 | 3/2 |
| OBA help RISC | 110000 | RISC to ITPBUF to DRAM | 3 | 3 | 3 | 3/2 |
| IBA & OBA help RISC | 100000 | DRAM to ITPBUF to RISC to ITPBUF to DRAM | 1/3 | 3 | 3 | 3/2 |

The programmable addressing block 410 generates addresses and coordinates handshaking signals to retrieve image data from and to store data to the external memory. Image data does not flow through the programmable addressing block 410 but flows to the local buffers of the programmable arithmetic processing block 420. The programmable addressing block 410 supplies control signals to coordinate the transfer of image data with the programmable arithmetic processing block 420.

The programmable addressing block 410 has an input addresser 430 and an output addresser 440. In the input addresser 430, an input block addresser (IBA) 442 provides addresses to a read address bus to request data from an external memory, such as a DRAM, using handshaking control signals, such as read address available (R_Address Avail) and read address acknowledge (R_Address Ack). An input buffer controller (IBC) 444 supplies addressing information to the local buffers of the programmable arithmetic processing block 420 to store the requested image data from the external memory on a read data bus in buffers in the programmable arithmetic processing block 420 using handshaking signals. The handshaking signals are read data available signal (R_Data avail) and read data acknowledge signal (R_Data ack).

In the output addresser 440, an output block addresser (OBA) 446 provides addresses to a write address bus to store data in the external memory using handshaking control signals such as write address available (W_Address Avail) and write address acknowledge (W_Address Ack). An output buffer controller (OBC) 448 supplies addressing information to the local buffers of the programmable arithmetic processing block 420 to transfer the image data from the local buffers of the programmable arithmetic processing block 420 to the external memory. The output buffer controller 448 uses handshaking signals to retrieve the processed image data from the programmable arithmetic processing block 420. The OBC 448 uses handshaking signals, such as write data available signal (W_Data avail) and write data acknowledge signal (W_Data ack), to coordinate the transfer of data from the local buffers of the programmable arithmetic processing block 420 to the external memory.

The programmable arithmetic processing block 420 receives the image data, processes the image data and outputs the processed image data. A SIMD master controller 450 controls the operation of the programmable arithmetic processing block 420. Both the programmable arithmetic processing block 420 and the SIMD master controller 450 communicate with the camera's microprocessor (RISC) 202 (FIG. 2).

The Addressers

The input block addresser (IBA) 442 and output block addresser (OBA) 446 supply addresses to each address bus. The IBA 442 provides addresses of requested data to supply to the read data bus, i.e., data to be operated on by the programmable arithmetic processing block 420. In particular, the IBA 442 generates DRAM memory word addresses for two-dimensional blocks or lines of image data. The OBA 448 provides addresses of processed data to write to the write data bus, such as image data to be stored in the image memory.

The Input Block Addresser

Figure 5:
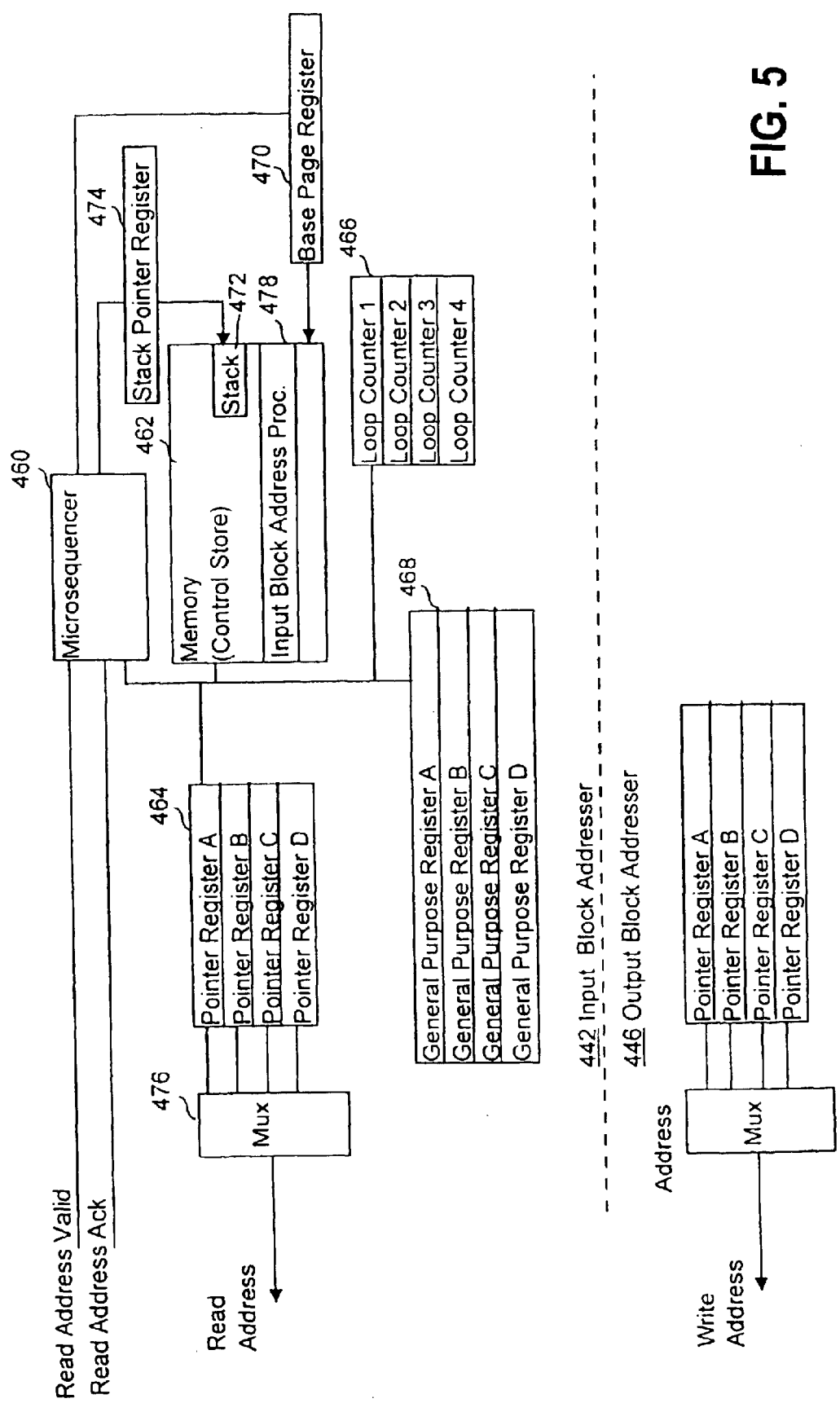
FIG. 5 is a block diagram of a programmable block addresser of the image transform processor of FIG. 4.

Referring to FIG. 5, the input block addresser 442 is configurable (i.e. programmable). The input block addresser 442 has a microsequencer 460, a control store or instruction memory 462, and pointer registers A, B, C and D 464. The input block addresser 442 has four loop counters 466, four general purpose registers 468 and four pointer registers 464. The pointer registers A, B, C and D 464 generate the input address which is output to the read address bus by the multiplexor 476. The input block addresser 442 also has a base page register 470 and a stack 472 that is part of the control store 462 and a stack pointer 474. The control store 432 is typically implemented using a static RAM array.

The microsequencer 460 is coupled to the control store 462 and the pointer registers 464 and generates the input data addresses to access the memory, such as a DRAM, storing the image data. The microsequencer 460 stores the addresses in the pointer registers 464. The addresses in the pointer registers 464 are utilized to access the DRAM memory. Data requested by the input block addresser 442 is stored in a buffer in the programmable arithmetic processing block 420 (FIG. 4). A multiplexor 476 selects the address in one of the pointer registers 464 to output to the read address bus based on commands executed by the microsequencer 460.

The control store 462 stores an input block address procedure 478 to be executed by the input addresser microsequencer 460. The input block address procedure 478 has a sequence of address generation instructions.

The input block addresser 442 has a data request command to initiate read operations to the image memory and to supply an absolute address to the read address bus. The microsequencer 460 can set a loop counter 466 to generate the desired number of request/acknowledge cycles. The microsequencer 460 loads and decrements the loop counter 466. The microsequencer 460 has other instructions enabling values to be added and subtracted from the pointer registers 464. Branching instructions can be responsive to the loop counter 466 and conditions. Call and return instructions are used with the stack 472 and stack pointer 474. Push and pop instructions are also used to push and pop the values in the general purpose registers 468, pointer registers 464, and loop counter registers 466 on and off the stack 462. The general purpose registers 468, pointer registers 464, and loop counter registers 466 can be loaded from other general purpose 468 and pointer registers 464. The contents of the general purpose 468, pointer 464 and loop counter 466 registers can be loaded with a constant value or added to each other. Table two describes a portion of the instruction set of the microsequencer 460.

TABLE 2

Input Addresser Microsequencer Instruction Set

| Instruction | Description |
| --- | --- |
| MADDPT | The MADDPT instruction adds a value to a specified pointer register. This instruction is similar to the DRQ instruction except that no data is requested. An immediate value ranging from zero to seven can be added to the specified pointer register, or the contents of one of the general purpose registers can be added to the pointer register. |
| MSUBPT | This instruction subtracts a value from a specified pointer register. An immediate value ranging from zero to seven can be subtracted from the specified pointer register, or the contents of one of the general purpose registers can be subtracted from the pointer register. |
| LOOP | The loop instruction branches to a specified address when a specified loop counter register does not equal zero and decrements the loop counter. |
| LCI | This instruction loads a loop counter register with an immediate value. |
| BR | The branch instruction causes the microsequencer to execute the instruction at a specified address. |
| CALL | The call subroutine instruction calls a subroutine. The return address is pushed onto the stack and the microsequencer's instruction pointer is loaded with a specified address. A stack pointer register is also decremented. |
| LD | The Load Source to Destination instruction loads a specified destination register such as the one of the general purpose, pointer or loop counter registers from a specified source register such as one of the general purpose or pointer registers. |
| ADD | The add instruction adds the contents of the specified source and destination registers and stores the result in the destination register. |
| PUSH | Push decrements the stack pointer and writes the contents of the specified register onto the stack. |
| POP | POP writes the data pointed to by the stack pointer from the stack onto the specified register and increments the stack pointer. |
| INC | Increments any specified register. |
| LDMODE | Loads the Input Block addresser's Mode register with a three-bit immediate value. The arithmetic block has a branch instruction that tests the state of any one of the three bits. |
| SET | Sets the addresser's DONE flag in the collector's interrupt register to signal the end of an operation. |
| NOP | No operation |
| RET | Return from subroutine pops the stored instruction address from the stack and places the instruction address in the microsequencer's instruction pointer. |
| HALT | The halt instruction stops the microsequencer from executing the program in the control store. |

The micro processor in the camera loads the input block addresser's 442 control store 462 with the input block address procedure 478 for each image transform operation. In response to the microprocessor, the microsequencer 460 begins executing the input block address procedure 478 and generates the desired addresses. Those skilled in the art recognize that the output block addresser 446 and output buffer controller 448 have similar components and operate in a similar manner to the input block addresser 442 and input buffer controller 444.

The Output Block Addresser

The output block addresser 446 is a duplicate of the input block addresser 442 shown in FIG. 5 except that the output block addresser 446 generates addresses for storing the data from the local buffers of the programmable arithmetic processing block 420 in the external memory. The description for the configuration registers and microsequencer of the input block addresser 442 applies to the output block addresser 446. To generate the addresses, the control store stores an output block address procedure instead of the input block address procedure. In an alternative embodiment the output block addresser 446 can have different features from the input block addresser 442 and therefore would not be a duplicate.

The Programmable Arithmetic Processing Block

In FIG. 5, the topology of the programmable arithmetic processing block 420 of FIG. 4 is shown. In the arithmetic processing block 420, a four-by-five array of local buffers (LB) 500 is associated with five processing elements (PE) 510, 511, 512, 513 and 514. The local buffers 500 are arranged in rows and columns. Two rows of local buffers 520 and 521 function as input buffers to receive data in response to the input buffer controller 444 (FIG. 4). The other two rows of local buffers 522 and 523 function as output buffers to output processed image data in response to the output buffer controller 448. Each column is referred to as a bank. The local buffers are designated as LB(X,Y), where X is the column (bank) designation and Y is the row (bank) designation. For example, LB(00) refers to the local buffer in bank zero, row bank zero 520. The RISC stores data to and reads data from each of the local buffers 500. In one embodiment, each local buffer maybe implemented as a 768 byte single-ported memory.

In each bank (Bank0–Bank5) of the four-by-five array, a respective processing element (PE) 510–514 is associated with the local buffers 500 of that bank. However, another bank, bank five, that has no associated PE, is included to provide boundary data for the PE four 514 of bank four, such as when performing convolutional algorithms on the image data. In one embodiment, local buffer (LB) fifty-three may be omitted because level three is primarily used as a temporary buffer for the processed image data that is to be output by the output block addresser 446 and output buffer controller 448.

Each PE 510–514 accesses image data from and stores image data in each of the local buffers in that bank. Each processing element 510–514 also accesses the image data in the local buffers 500 of the right adjacent bank, such as when performing convolutional algorithms. Because the SIMD master controller 450 simultaneously controls the operation of the processing elements 510–514 such that each processing element 510–514 executes the same instruction. The SIMD master controller 450 has a memory that stores an image processing procedure that controls the operation of the processing elements 510 and local buffers 500. During processing, blocks of data are continuously fetched from external memory to the local buffers by the input block addresser 442 and input buffer controller 444, or from the image sensor via the frame capture processor.

Many image processing algorithms can be decomposed into a series of discrete phases, each performing a single step of the image processing algorithm. In each step of the image processing procedure, the SIMD master controller 450 will read input data from one level of buffers, perform the computation, then store the image data resulting from that computation to a different level of buffers. Simultaneously, additional input image data is loaded into another level of buffers, and the output block addresser 446 stores the results of the computation on a previous block of image data from another level.

Figure 6:
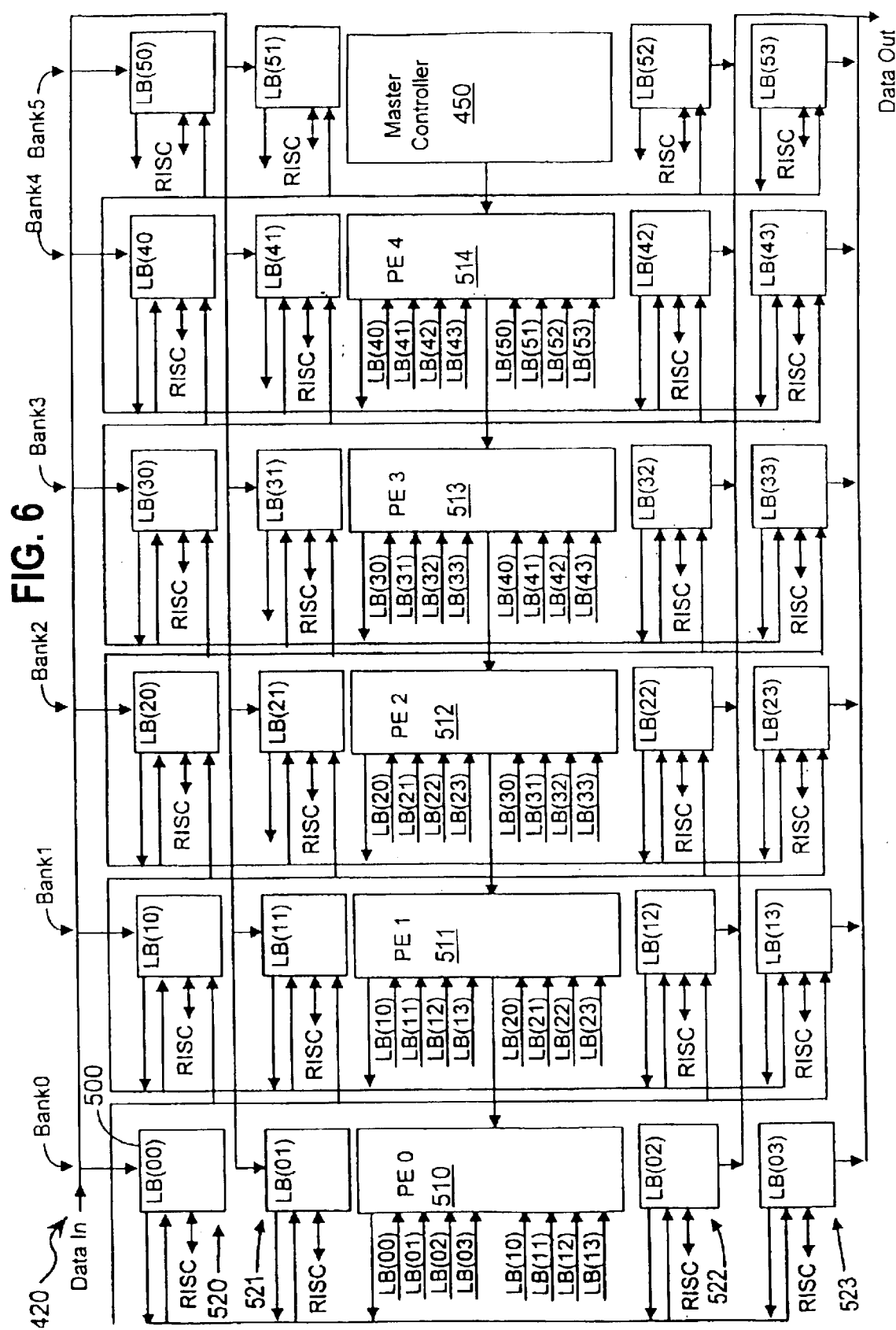
FIG. 6 is a block diagram of the topology of the arithmetic processing block of FIG. 4.

In FIG. 7A, an exemplary timing diagram of the local buffer pipeline is shown. In phase zero, at the start of processing, all local buffers 500 (FIG. 6) are owned by the SIMD master controller 450 (FIG. 6). When the SIMD master controller 450 assigns ownership of the level zero buffers to the IBA/IBC, using the "assign level" instruction, the IBA/IBC loads the first block of input data into the buffers of level zero. When the load completes, ownership of the local buffers 500 of level zero is returned to the SIMD master controller 450.

In phase one, the processing elements read data from level zero (SIMD READ), perform the first processing step, and store the result in the buffers 500 of level one (SIMD WRITE). When the first processing step completes, and the data in the level zero buffers is no longer needed, ownership of the buffers of level zero is transferred back to the IBA/IBC by the SIMD master controller 450 so that the next block of input image data can be fetched.

In phase two, the IBA/IBC loads image data in the buffers of level zero, the SIMD master controller 450 performs the next processing step by reading the buffers 500 of level one (SIMD READ), and writing to the buffers of level two (SIMD WRITE). In phase three, the SIMD master controller 450 performs the final processing step by reading the data from the buffers of level two (SIMD READ), and writing image data to the buffers of level three (SIMD WRITE). When this processing step is complete, ownership of the buffers 500 of level three is returned to the OBA/OBC, so that the output image data can be stored in the external memory. When the OBA/OBC completes the transfer of the output image data to the external memory, ownership of the buffers 500 of level zero is returned back to the SIMD. Meanwhile, the SIMD master controller 450 begins processing the second block of input image data.

As shown in the example of FIG. 7B, for video processing or other real-time data stream, the buffers of level zero and level one are alternately used for fetching input image data, while the buffers of level two and level three are alternately used for storing output image data. In this way, image data is input, processed and output in every cycle.

The local buffers reduce the address range of the SIMD master controller 450, reduce power consumption by minimizing the number of external memory accesses, and increase the efficiency by allowing long "burst" data transfers with the external memory. This topology also improves the overall image processing performance without the cost of a complex caching scheme by allowing data fetches and stores to occur in parallel with image processing.

The combination of the block addressers (IBA, OBA), buffer controllers (IBC, OBC) and local buffers 500 allows image data to be transferred to and from the local buffers 500 in complex ways. Either in cooperation with the block addresser or directly from the frame control processor, words of data are transferred to and from the local buffers by the buffer controllers. The buffer controllers have several interconnected counters. A small register set within each buffer controller configures the range of the counters. The counters determine the order in which the local buffers 500 are addressed. By loading and executing a buffer addresser procedure and configuring the registers of the buffer controllers, data can be fetched in complex orderings from the external memory and be arranged in the local buffers for subsequent processing.

Figure 8:
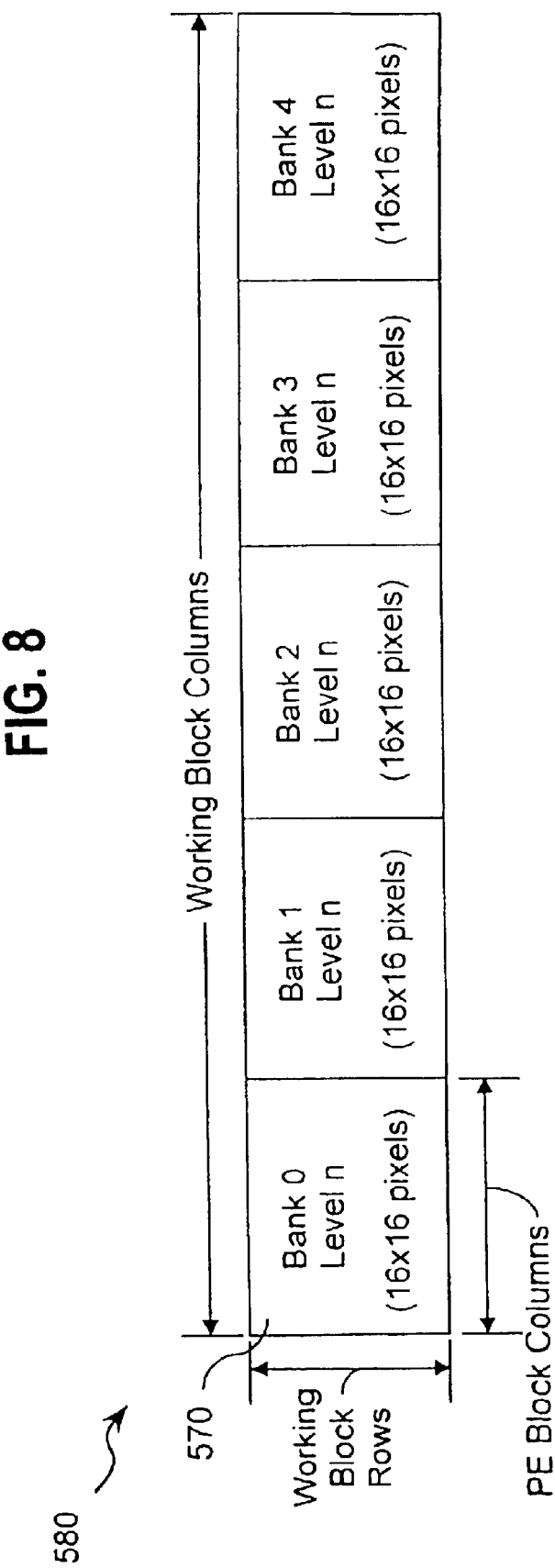
FIG. 8 is a diagram of an exemplary two-dimensional array of working blocks.
Figure 9:
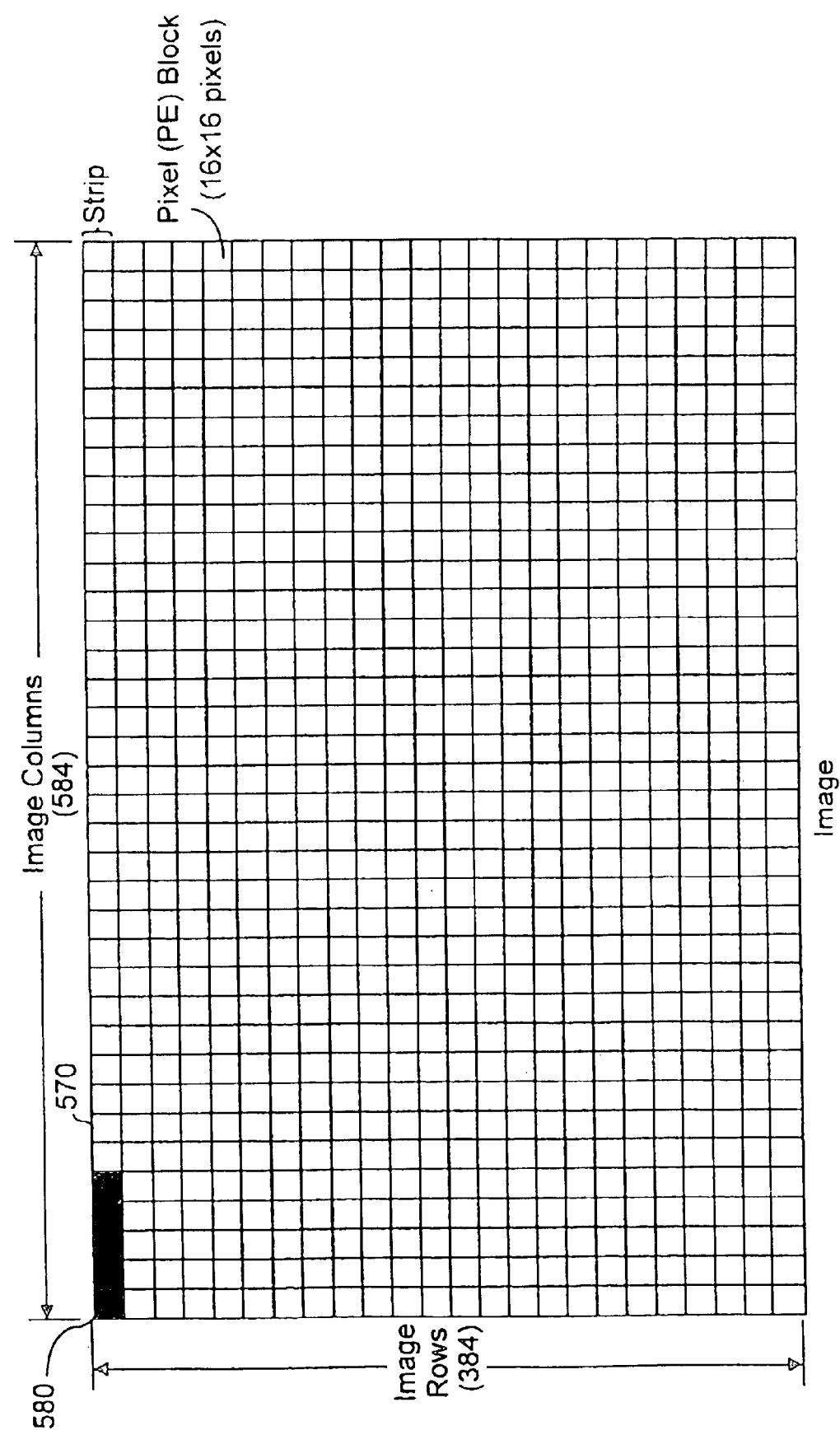
FIG. 9 is a diagram of exemplary image data showing the pixel blocks of an exemplary working block.

Referring to FIG. 8, working block columns (WBC) are shown. Referring also to FIG. 9, to visualize how the block addressers and buffer controllers operate, consider an eight-bit monochrome image, 584 pixels wide by 384 pixels high, which is to be divided into sixteen by sixteen pixel blocks. One pixel block 570 is provided to each processing element for processing. In some applications, the transfer of image data from the external memory to the local buffers is a copy between multi-dimensional arrays. The image data in the external memory is a large two-dimensional array with rows and columns of pixels. This large array can also be represented with many two-dimensional arrays of sixteen-by-eighty pixels, or five pixel blocks 580, or a WBC 580. The WBC 580 is loaded into the SIMD master controller 450 (FIG. 6), one per level of buffers, for processing. For example, the working block 580 of FIG. 8, has five pixel blocks 570 of image data and is loaded into local buffers 00, 10, 20, 30 and 40 of level zero. More generally, a WBC is a subset of the image data that is distributed across a predetermined subset of the local buffers of a level. The WBC is also the unit of data transfer between the external memory and the local buffers.

In the image data of FIG. 9, the first sixteen complete rows of image data, called a strip 590, is five-hundred eighty-four pixels wide by sixteen pixels high. The strip has thirty-seven pixel blocks, the last of which is eight pixels wide, instead of sixteen. An exemplary set of adjacent pixel blocks (shaded), making up an exemplary working block, is also shown. Since there are thirty-seven pixel blocks in most strips, to transfer an entire strip, seven full WBC, each having five pixel blocks, are transferred. An eighth, partial, working block, having a single full pixel block, and a single partial pixel block, is also transferred. Because the block addressers and the buffer controllers transfer thirty-two bit words, all pixel block row dimensions, and therefore working block row dimensions, are multiples of thirty-two bits.

Figure 10:
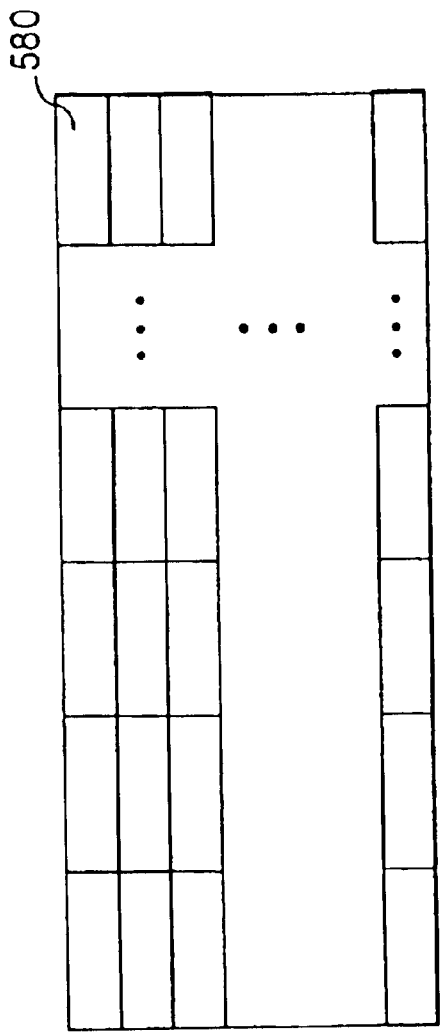
FIG. 10 is an example of a working block that includes adjacent pixel blocks in the image data.

In FIG. 10, an exemplary set of WBC 580 of image data is shown. Because image data is transferred in working blocks, all strips of the image data are trasferred in the same manner. More generally, the block addressers and buffer controllers are not limited to sixteen-by-sixteen pixel blocks. The block addressers and buffer controllers are designed to operate with any number N of rows and columns (M) per pixel block, and any number (P) of pixel blocks per strip.

Figure 11:
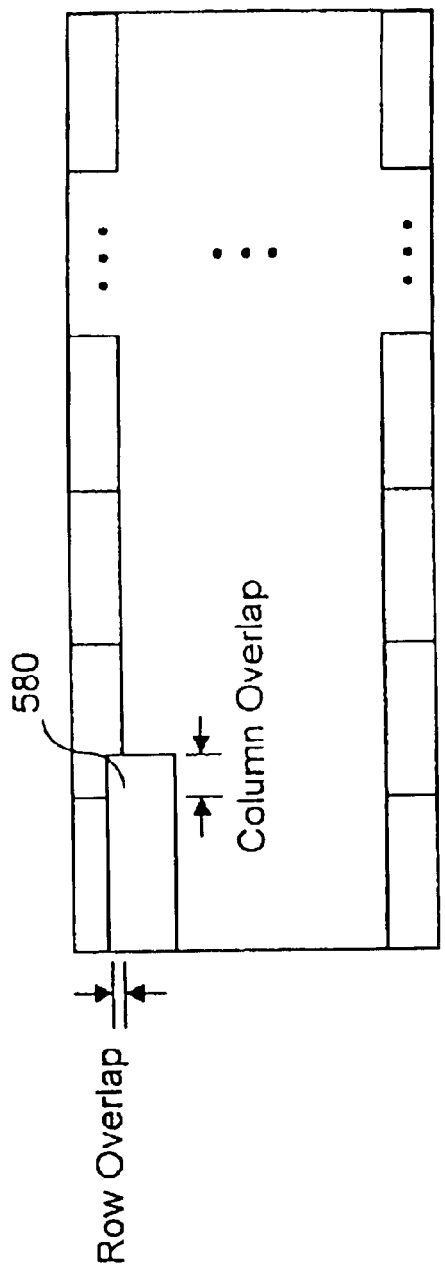
FIG. 11 is a diagram showing overlapping working blocks in the image data

When transferring data, the buffer controllers read or write an entire working block of image data at a time, starting from the top left bank (bank zero, pixel block row zero, local buffer bank zero), traversing the entire working block row, then continuing with the first pixel of the second row (pixel block row one, local buffer column zero). The block addresser is programmed to generate addresses to fetch the data from the external memory in the aforementioned order. Referring to FIG. 11, an alternate arrangement of working blocks of image data is shown. Both the rows and the columns of the working blocks overlap.

In FIG. 12A, an alternate arrangement of pixel blocks of a WBC is shown. The pixel blocks 570 of the WBCs are shaded. In this example, the pixel blocks of the WBCs are not adjacent in a column but staggered.

Figure 12B:
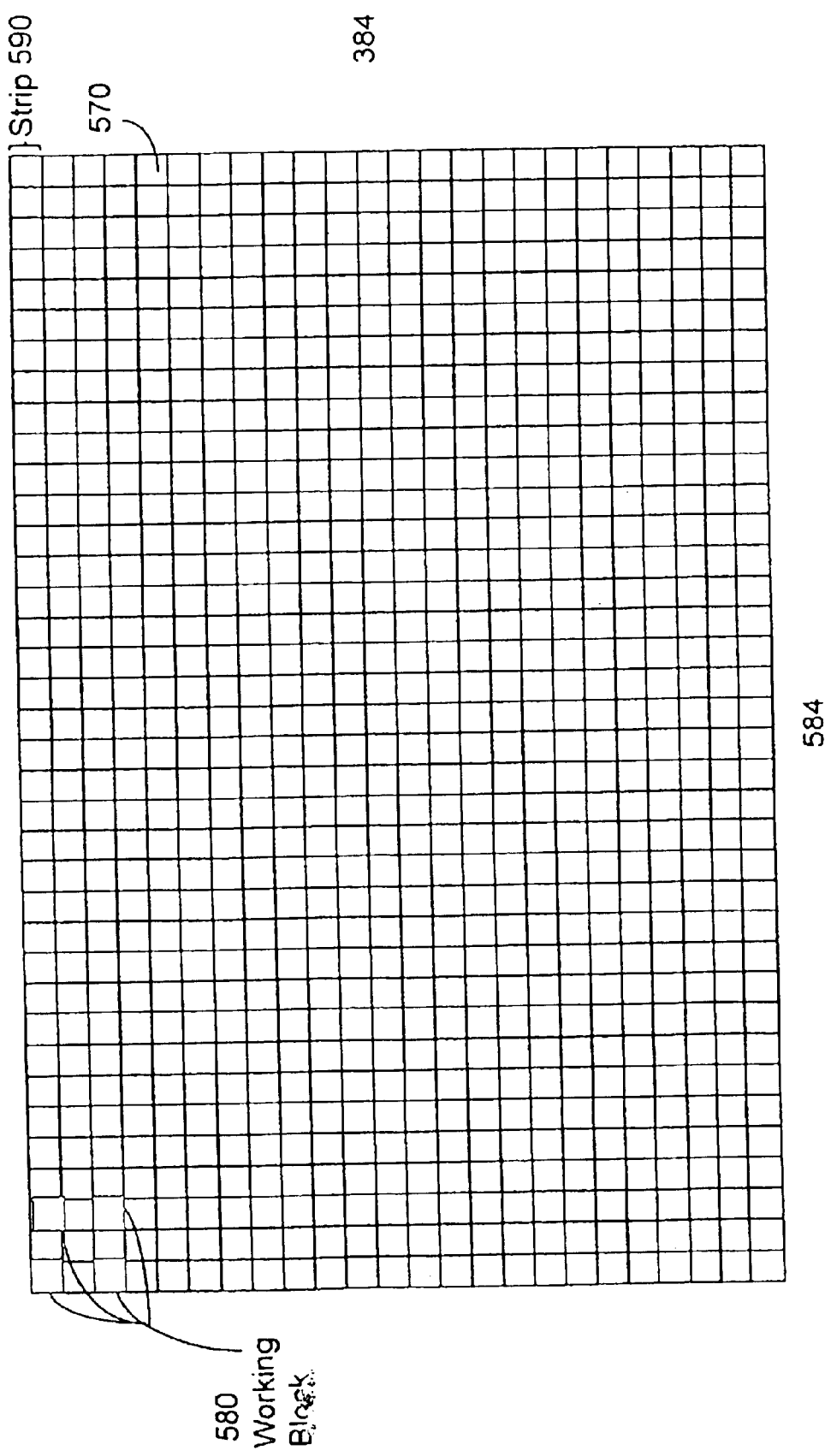

In FIG. 12B, another alternate arrangement of the pixel blocks is shown. The pixel blocks 570 of the WBCs are shaded. In this example, the pixel blocks are not adjacent, and are dispersed throughout the image data and not in a column.

Figure 13:
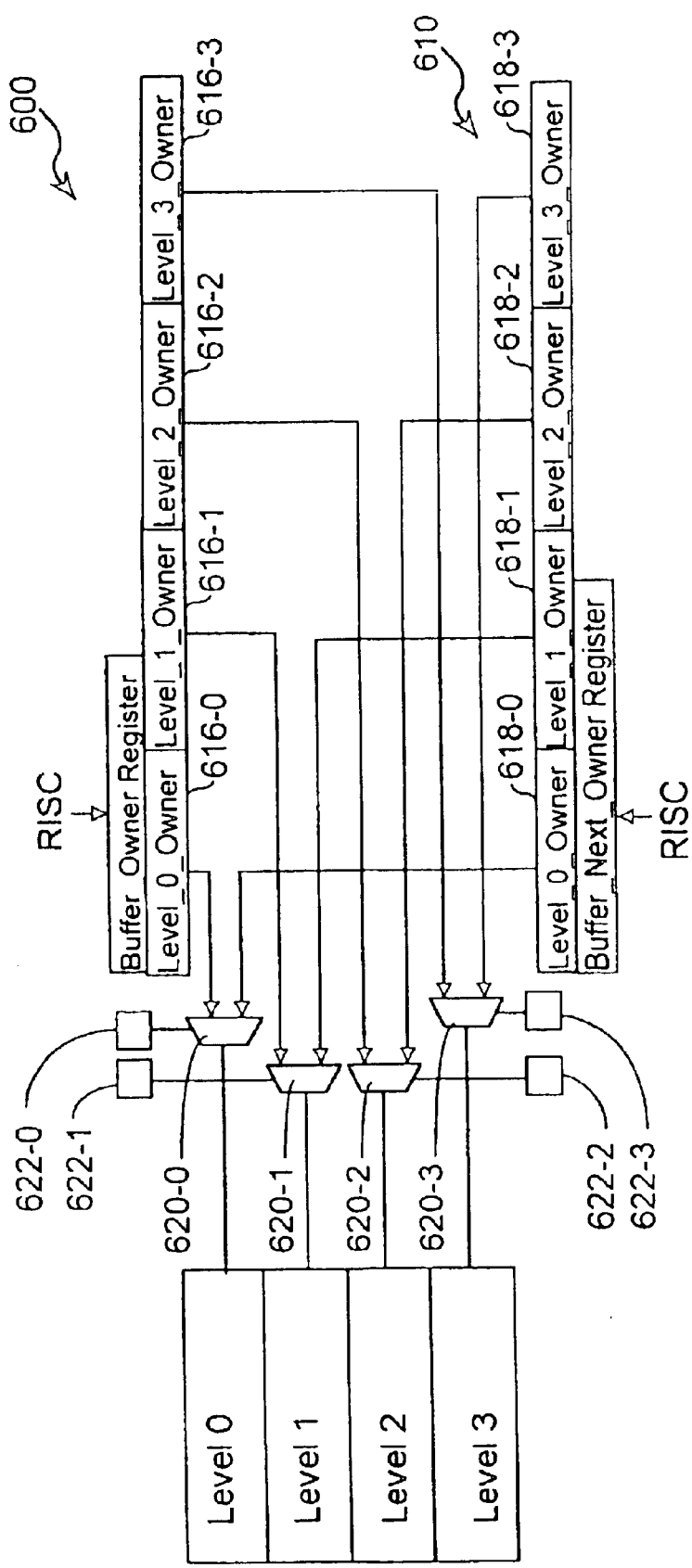
FIG. 13 is a block diagram of the buffer owner register and next owner register of the arithmetic processing block of FIG. 6.

In FIG. 13, the various components of the image transform processor is shown. The buffer owner register 600 and buffer next owner register 610 are shown. In the buffer owner register 600 and buffer next owner register 610, a set of buffer owner bits that designate the owners of buffer level zero 612, one 614, two 616 and three 618 are shown. For the buffers at each level, a multiplexor 620 receives the buffer owner bits from the buffer owner register 600 and the buffer next owner register 610. For each level, a toggle bit 622 connected to the select line of a respective multiplexor 620 selects the specified set of owner bits. The toggle bit 622 is set by the buffer controllers. A semaphore system is used to determine which device has ownership and when to switch the ownership of a particular buffer level. The RISC loads the buffer owner register 600 and the buffer next owner register 610.

Buffer Controller

Figure 14:
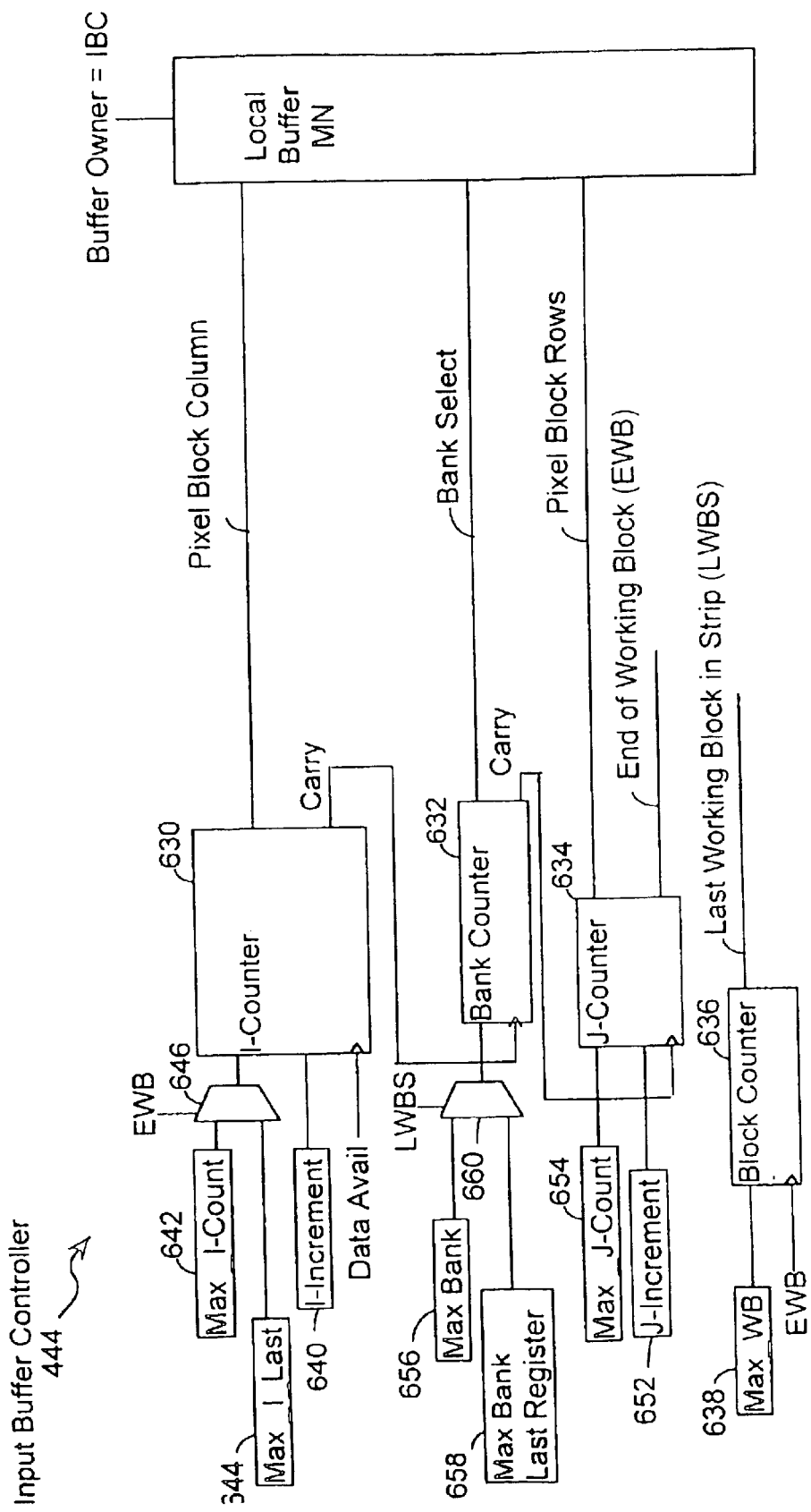
FIG. 14 is a block diagram of an input buffer controller of FIG. 4.

In FIG. 14, each buffer controller 444 and 448 has a synchronous memory interface with data-request-acknowledge handshaking and a thirty-two bit data bus. The buffer controllers 444 and 448 access the local buffers in a preconfigured sequence until a preconfigured limit is reached. The input buffer controller 444 accesses the local buffers in levels zero and one. The output buffer controller 448 accesses the local buffers in levels two and three.

The buffer controllers 444 and 448 supply address and control signals to the local buffers, accesses the local buffers that are specified as owned by that buffer controller 444 or 448 by the buffer owner register to read data from or write data to specified locations in the local buffer. The buffer controller 444 and 448 utilize a set of cascaded counters including an I-counter 630, a bank counter 632 and a J-counter 634 to generate the control signals to cycle through the level of local buffers specified by the buffer owner register as being owned by the input buffer controller (IBC) 444. Each local buffer 500 is arranged in rows and columns. The I-Counter 630 generates a "pixel block column" signal that specifies a column the local buffer. The bank counter 632 generates a "bank select" signal that specifies a particular bank of local buffers. The J-counter 634 generates a "pixel block row" signal that specifies a row in the local buffer. In other words, a particular local buffer is specified by the buffer owner register and the bank counter 632. Within each local buffer, the I-counter 630 and J-counter 632 select a particular column and row.

The clock input of the I-counter 640 is connected to data available; therefore, the I-counter 640 is incremented each time a word is transferred to the local buffer. To cascade the counters, the carry from the I-counter 630 is connected to the clock input of the bank counter 632; and, the carry of the bank counter 632 is connected to the clock input of the J-counter 634. For example, a local buffer and a row within that local buffer are specified; and the IBC 444 transfers data to each column in the specified row of the local buffer and then changes to the local buffer in the next bank. The IBC 444 continues to transfer data across the columns and change banks until the last bank is reached. After data has been transferred to the last bank, the IBC 444 increments the J-Counter and transfers data to the next row. Because the IBC 444 is the same as the output buffer controller 448 except for the signaling to transfer data to and from the local buffers, and connecting the clock input of the I-counter 630 to "data taken" rather than "data available".

In particular, the I-counter 630 counts pixel block columns to generate the pixel block column select signal to select a particular column within each local buffer 500. After the last pixel block column is transferred to the local buffer, the carry bit of the I-counter 630 is set. The bank counter 632 counts the banks and generates bank select signals to select a particular bank. In response to the carry bit from the I-counter 630, the bank counter 632 is incremented and selects a different bank. The J-counter 634 counts the rows of the pixel blocks and generates row select signals to select a particular row within each local buffer. Each counter 630, 632 and 634 is associated with at least one maximum count value register which determines when the corresponding counter generates a carry and is reset to zero. The maximum count value registers will be described below.

A block counter 636 counts the number of working blocks in a strip to generate a last working block in strip (LWBS) signal. A maximum block count register 638 specifies the number of working blocks within a strip for the block counter 636. The block counter is incremented by an end of working block signal (EWB) that is output by the J-Counter. The block counter 636 is reset each time the maximum number of working blocks in a strip is reached.

A programmable I-counter increment register (I-Increment) 640 sets the increment of the I-counter 630. The I-counter increment register 640 determines the address offset between successive read or writes within a pixel block row. The I-counter increment register 640 is usually set equal to one.

For the I-counter 630, a maximum I-count register, Max_I-Count, 642 sets the number of words in a pixel block row for all full pixel blocks. A Maximum I-Last register 644 sets the number of words in pixel block row for the last pixel block of a strip to accommodate partially full pixel blocks. In response to the state of the end of working block signal, a multiplexor 646 supplies the value of the Max_I-Count register 642 or the value of the Max_I_Last register 644 to the I-counter 630.

The J-counter 634 has a programmable increment value register, J-Increment, 652 which determines the address offset between the first word of successive rows of a pixel block. A maximum J-count value register, Max_J-Count, 654 determines the offset between the first word of the first row of a pixel block and the first word of the last row of a pixel block.

The bank counter 632 has a maximum count value register, MaxBank, 656 that determines the number of banks to transfer data to for each full working block. A second maximum count value register, MaxBank Last, 658 determines the number of banks to transfer data to or from for the last working block of a strip. In response to the state of the last working block in a strip signal (LWBS), a multiplexor 660 supplies the value of the MaxBank register 642 or the value of the MaxBank Last register 644 to the I-counter 630. In this way, a subset of the banks can be used for the last working block in a strip.

For example, in one implementation, the buffer controller 444 counter settings are determined as follows:

I-Increment 640, the address increment between successive words of each pixel block row, is set to one.

Max_I-Count 642 is set equal to the number of words per pixel block minus one.

Max_I_Last 644 is set equal to the number of words per row for the last pixel block of a strip minus one. If all pixel blocks have the same size, then the value in Max_I_Last 644 is set equal to the value in Max_I-Count 642.

J-Increment 652 is set equal to the offset, in words, within an ITP buffer between consecutive pixel block rows. The value in J-Increment 652 is usually set equal to the value in Max_I-Count 642 plus one. When transferring one-dimensional data, the values of J-Increment 652 and Max_J-Count 654 can be set equal to zero, resulting on a single row of data being transferred to each bank.

Max_J-Count 654 is equal to the offset, in words, of the first word of the last row of a pixel bloc. The value of Max_J-Count 654 is usually set as follows:

Max_J-Count=(the number of working block rows−1)*J_Increment 652.

MaxBank is equal to the last bank to be loaded for all but the last working block of each strip. This will usually be equal to the number of active pixel blocks minus one if non-convolutional algorithms are being used, or the number of active pixel blocks if convolutional algorithms are being used, to provide the boundary data for the last active pixel block.

MaxBankLast is equal to the last bank to be loaded for the last working block of each strip. If the number of pixel blocks per strip is exactly divisible b the number of active pixel blocks, the value of MaxBankLast will be equal to MaxBank, otherwise, the value of Max-BankLast is determined as follows:

$$\frac{(WordsPerImageRow-WordsPerWorkingBlockRow-1)}{WordsPerWorkingBlockRow}$$

A buffer controller begins a sequence to transfer image data when it is enabled and has been given ownership of a buffer level by the buffer owner register 600 (FIG. 13). When a buffer controller complete a data transfer sequence on a particular level of local buffers, the buffer controller generates a control signal to toggle a toggle bit 622 connecting to the associated multiplexor for that level to toggle the owner of that level to the next owner register 610. The counters 630, 632, 634, 636 and the associated registers 638, 640, 642, 644, 652, 654, 656, 658 are loaded by the microprocessor (RISC).

Master Controller

Figure 15:
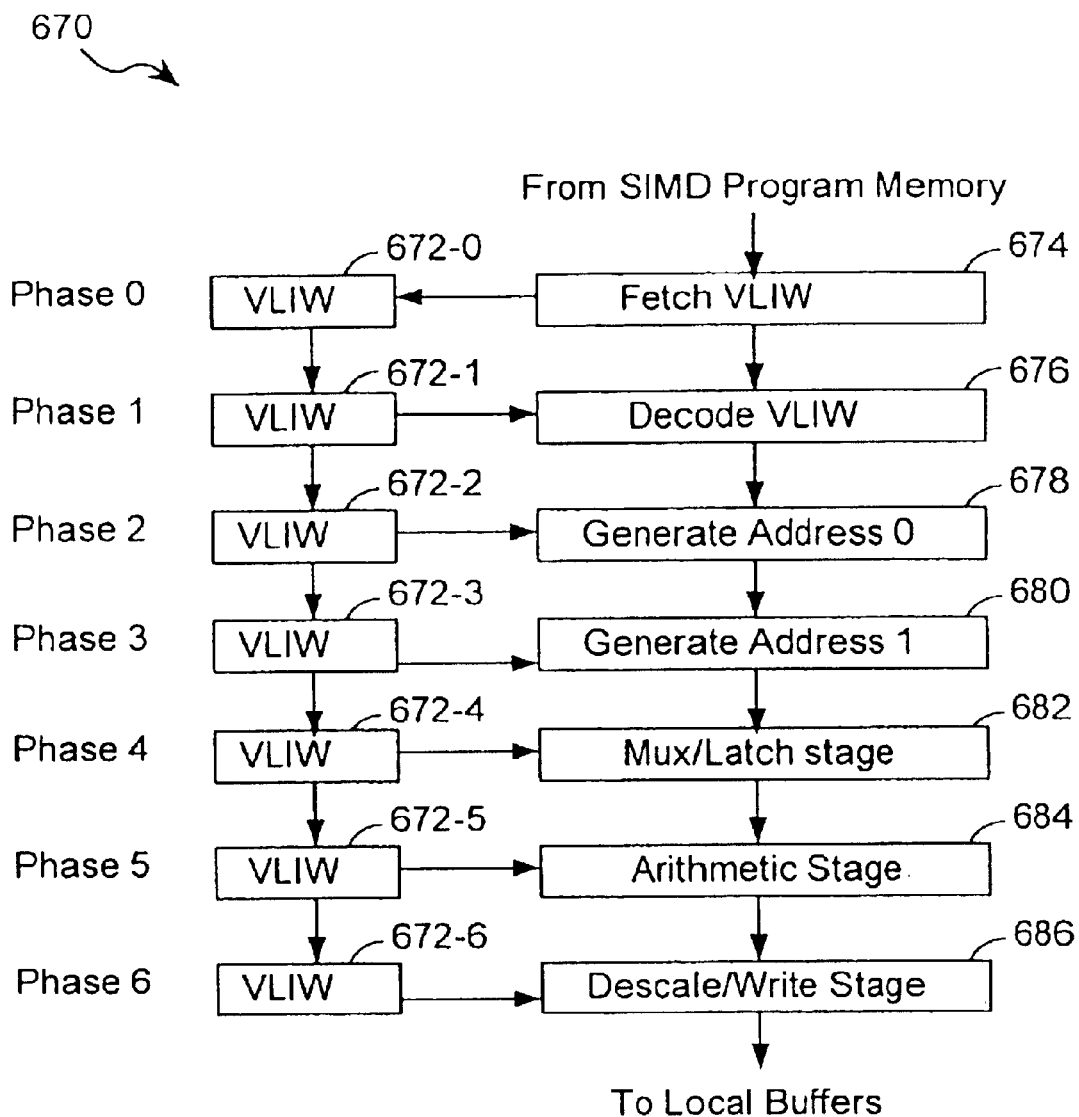
FIG. 15 is a block diagram of a SIMD processor pipeline.

In FIG. 15, the SIMD master controller 450 pipelined processor stages 670 are shown. The SIMD master controller 450 supports arithmetic instructions and many addressing modes by utilizing a very long instruction word (VLIW). In the pipeline 670, each stage or phase has a register that stores the portion of the VLIW 672 with the control signals for that stage and subsequent stages.

In phase zero 674, the master controller 450 fetches the VLIW from the control store and places the VLIW in VLIW pipeline register zero 672-0. In phase one 676, the master controller 650 decodes the VLIW that was retrieved in phase zero. Based on the instruction decode, the master controller 450 broadcasts control signals and coefficients to all the processing elements simultaneously.

Two phases, phases two and three, are used to generate an effective address to access the local buffers. In phase two 678, a portion of the effective address is determined from the decoded VLIW 672-2. In phase three 680, the generation of the effective address is completed and simultaneously broadcast to the local buffers. The effective address may be an effective byte address. The buffer owner register, at least in part, specifies which level of local buffers responds to the effective address.

In phase four 682, the VLIW 672-4 provides the control signals for a multiplexor/latch stage of each processing element (PE). The multiplexor/latch stage supplies the inputs to an arithmetic stage of each PE. In phase five 684, the VLIW 672-5 provides the control signals for the arithmetic stage to perform a computation based on the inputs from phase four. In phase six 686, the VLIW 672-6 provides the control signals for a descale/write stage of the PE.

Each PE has read and write access of up to eight buffer blocks. For most operations, each PE operates on data in the local buffer in its own bank. The PEs are also connected to the local buffers of the adjacent bank to the right to support horizontal filtering operations. Each phase uses one clock cycle, and a portion of the VLIW 672 and the results of the previous stage are passed to the next stage.

Figure 16:
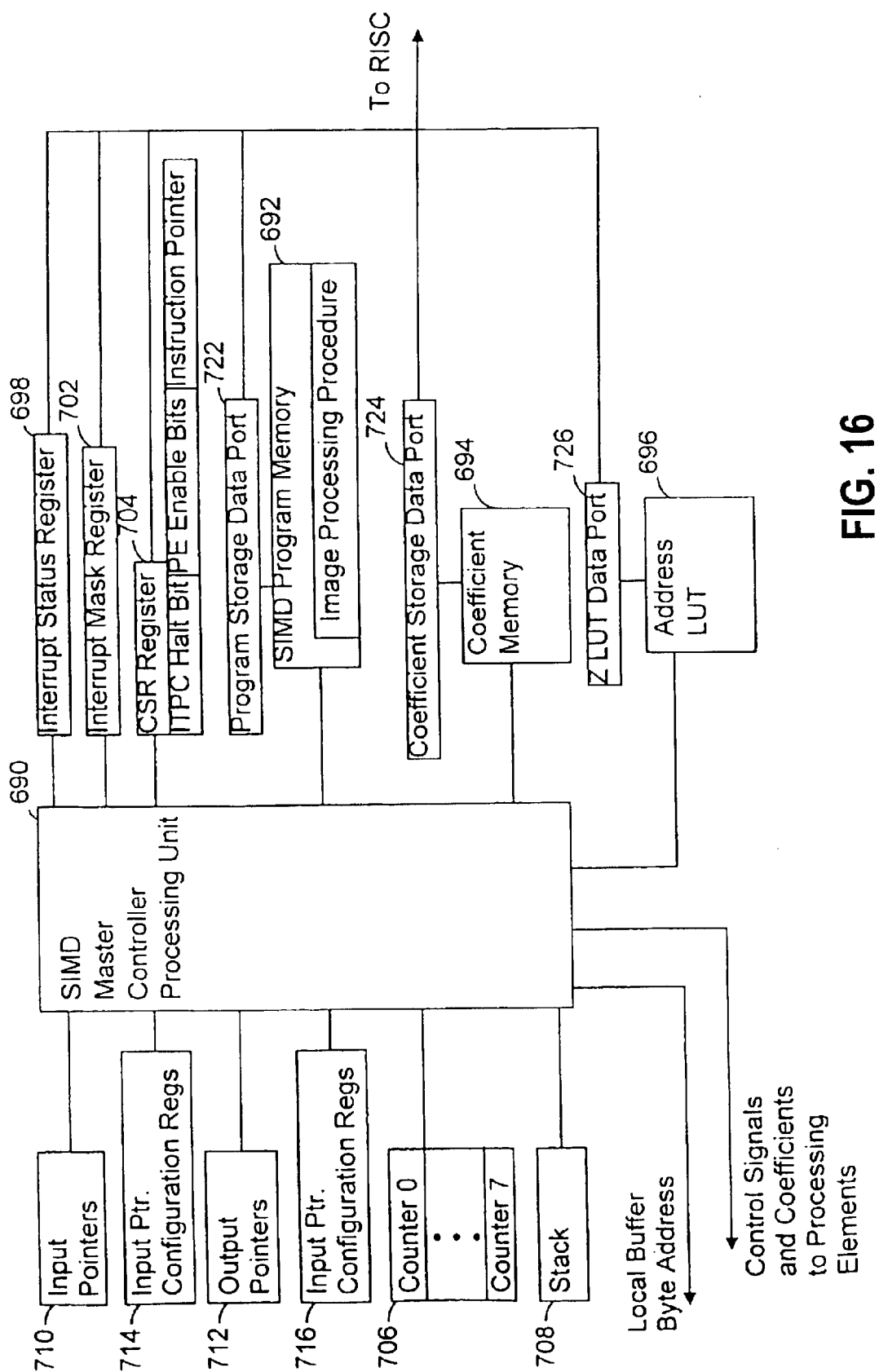
FIG. 16 is a block diagram of a SIMD processor of the arithmetic processing block of FIGS. 4 and 6.

In FIG. 16, a block diagram of the various components of the SIMD master controller 450 of FIG. 4 is shown. In the SIMD master controller 450, a SIMD master controller processing unit 690 is coupled to three static memories: a SIMD program memory 692, a coefficient memory 694, and an address mapping look-up table or address (LUT) 696. The SIMD master controller processing unit 690 also is coupled to an interrupt status register 698, an interrupt mask register 702, a control and status (CSR) register 704, counters 706, a stack 708, input pointer registers 710 and output pointer registers 712. The SIMD master controller processing unit 690 provides local buffer byte addresses, and control signals and coefficients to the PEs.

To minimize the width of the instruction word, the SIMD master controller 450 uses a pointer configuration table and a descale configuration table to provide a semi-dynamic way of supplying instructions with parameters. An input pointer configuration register 714 is associated with each input pointer register 710. An output pointer configuration register 716 is associated with each output pointer register 710. The values in the pointer configuration registers 714 and 716 specify the pointer type, the buffer level and the counters associated with that pointer.

A three-bit field in each VLIW 672 (FIG. 6), allows the programmer to select a descale configuration for each arithmetic instruction. Descale configurations in the descale register specify the upper and lower bounds check values, absolute value selection and other descaling parameters.

The SIMD master controller processing unit 690 executes with an image processing procedure 720 that is stored in the SIMD program memory 692. The microprocessor (RISC) loads the image processing procedure 720 into the program memory 692 via the program storage data port 722.

The microprocessor (RISC) processor can read from and write to the interrupt status register 698, the interrupt mask register 702, the control and status (CSR) register 704, the coefficient memory 694 and the address look-up table 696. The RISC processor stores data in the coefficient memory 694 and the address LUT 696 via the coefficient storage data port 724 and Z-LUT data port 726, respectively. The interrupt status register 698 is a read/clear register that indicates the status of each of the interrupt bits. The interrupt bits are masked by respective bits in the interrupt mask register; and the unmasked interrupt bits are "ORed" to form the interrupt request. The interrupt bits are readable by the RISC processor and are cleared by writing a zero. The interrupt bits are defined as follows:

BUFF_IRQ: buffer interrupt request;

IPTC_HALTED: ITP Master controller 450 halted;

OBA_DONE: Output block addresser done;

IBA_DONE: Input block addresser done;

HUFF_ERR: Huffman encoder/decoder error; and

HUFF_DONE: Huffman encoder/decoder done.

The interrupt mask register 702 stores the interrupt mask bits for the interrupt status register 698. The microprocessor (RISC) can read and write each of these bits. A value of one causes the interrupt to be masked. On power-up, the interrupt mask bits are set to one to disable all interrupts.

The CSR 704 has a HALT bit that the microprocessor (RISC) clears or sets to start or stop the ITP. The CSR 704 also has a five bit processing element enable field. Each bit in the processing element enable field enables the corresponding processing element when set to one, and disables the corresponding processing element when set to zero. The CSR also includes an instruction pointer which points into the SIMD program memory 692.

Effective Address Generation

Figure 17:
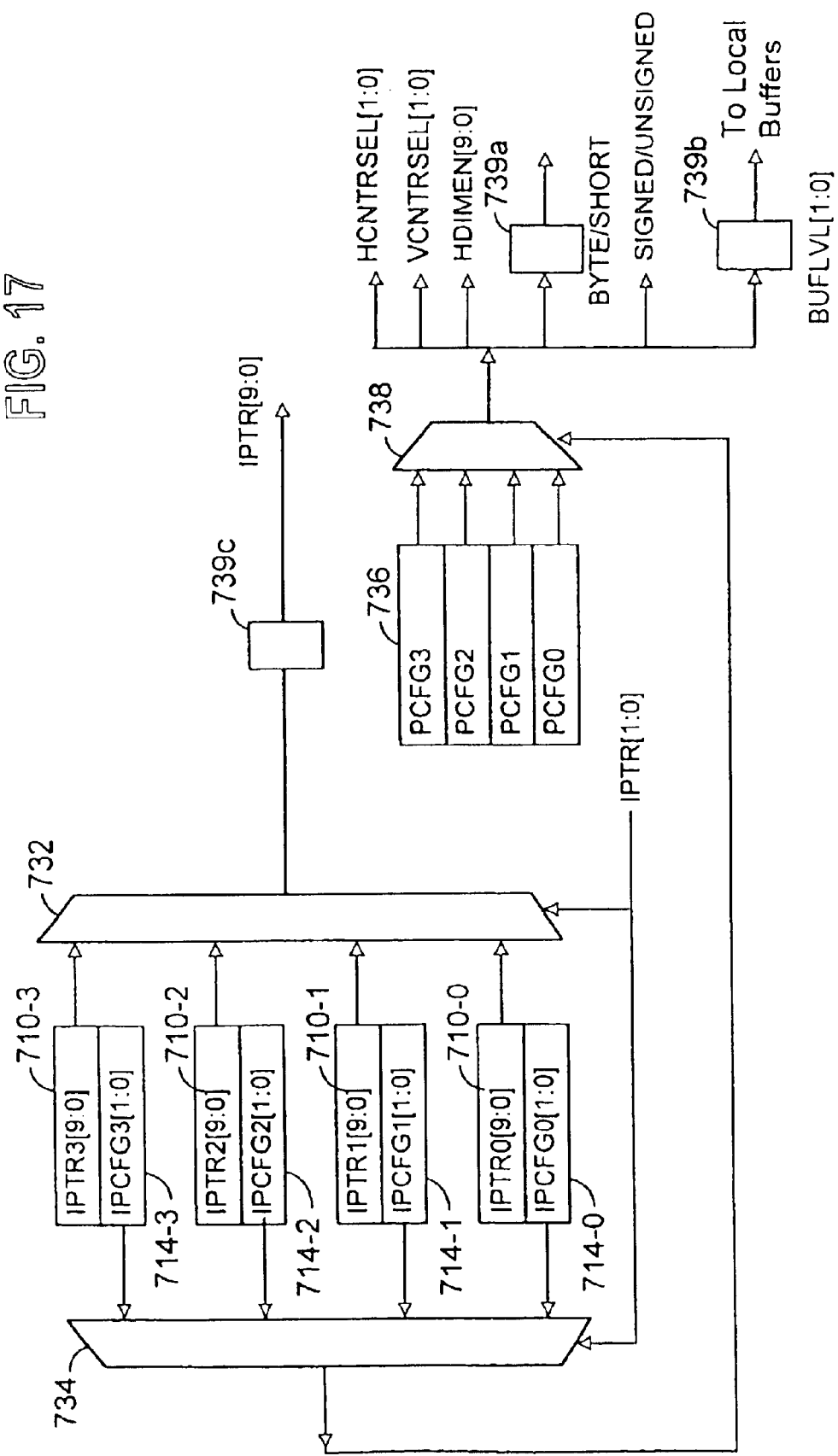
FIG. 17 is a block diagram of pointer configurations used by an instruction word.

In FIG. 17, a block diagram of the pointer configuration sets for the input pointers 710 is shown. In phases two and three of the pipeline stages, the SIMD master controller 450 generates and "effective address". The pointers 710 and pointer configuration sets 714 are preconfigured such that, when referenced by a VLIW instruction, an effective address generation circuit (FIG. 18) generates the effective address in one clock cycle. Such a configuration provides complex addressing that is performed in a short time.

Each input pointer register 710 is associated with an input pointer configuration register 714. Each pointer can be loaded with a nine-bit base address. Bits one and zero from the VLIW enable the pointer selection multiplexor 732 and the and the pointer configuration selection multiplexor 734 to select a specified pointer register 710 and pointer configuration register 714. The pointer selection multiplexor 732 supplies the value stored in the specified pointer register 710 to the effective address generation logic, described below.

Figure 18:
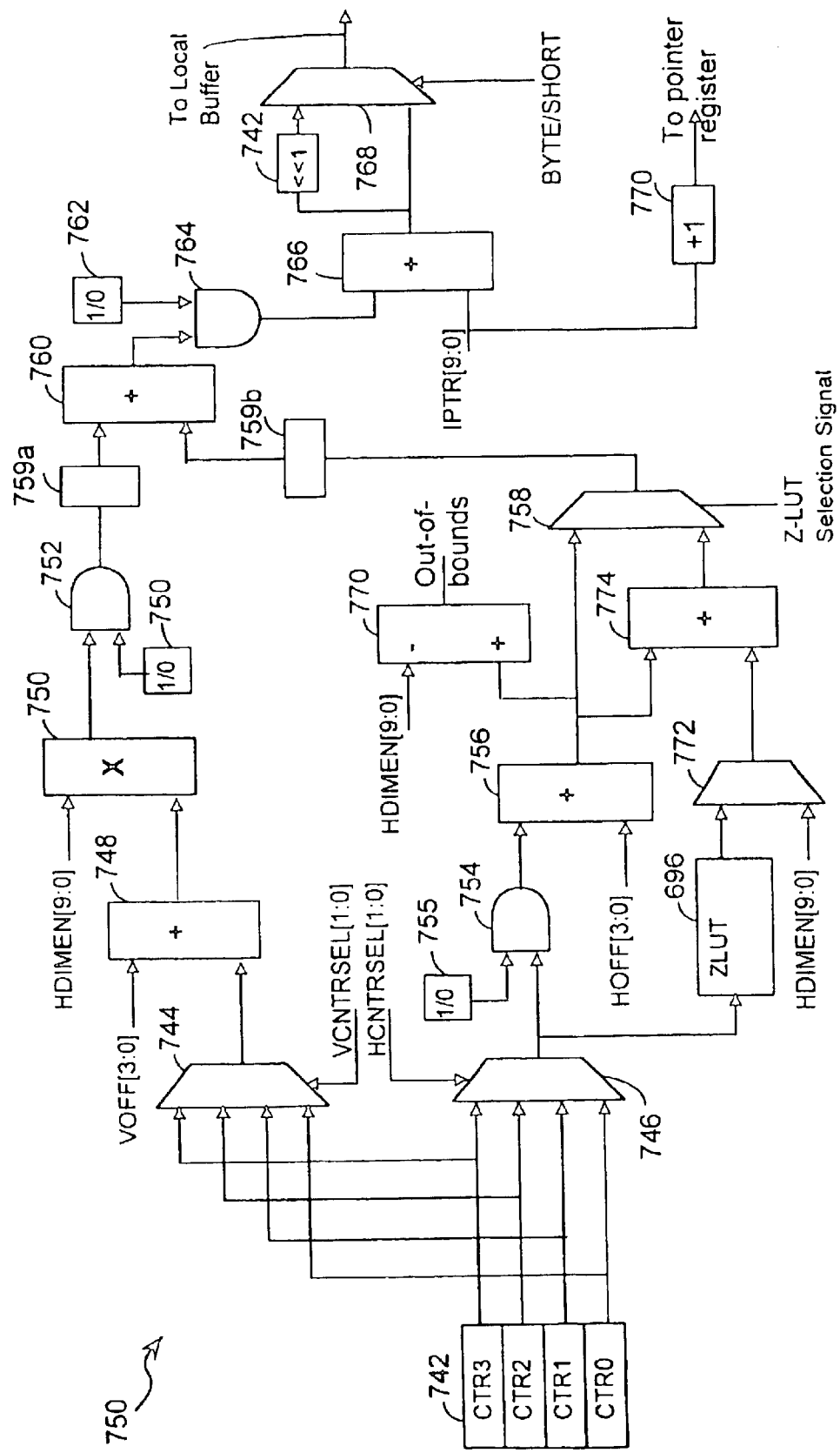
FIG. 18 is a diagram of a circuit that generates an effective address for an instruction.

The value in the specified pointer configuration register 714 that is output from the pointer configuration selection multiplexor 734 enables a pointer set multiplexor 738 to select one of the predefined pointer configuration sets 736 to used in the effective address generation circuit. The predefined pointer configuration sets are registers that include and specify the following fields:

HCNTRSEL[1:0]: a horizontal counter selection signal in the selected predefined pointer configuration set that selects one of four counters 732 of FIG. 18 as the horizontal counter;

VCNTRSEL[1:0]: a vertical counter selection signal in the selected predefined pointer configuration set that selects one of o of the specified pointer selects one of the four counters 732 of FIG. 18 as the horizontal counter;

HDIMEN[9:0]: defines a nine-bit horizontal dimension;

BYTE/SHORT: defines the format of the specified pointer as either a byte or a short integer. Latch 739a stores the BYTE/SHORT bit for use in subsequent stages;

SIGNED/UNSIGNED: defines the format of the specified pointer as either signed or unsigned;

BUFLVL[1:0]: selects one of the buffer levels. A BUFLVL latch 739b stores the BUFLVL[1:0] bits for use in subsequent stages.

Latch 739c latches the value of IPTR[9:0] for use in subsequent stages.

In FIG. 18, utilizing the control signals and the pointer of FIG. 17, the effective address generation circuit 750 is shown. The effective address generation circuit 750 generates the effective address to access the local buffers. As shown using the following C pseudo-code, the effective address generation circuit 750 provides the following addressing modes:

*Ptr++: This addressing mode increments the value of specified pointer by one. The "*" indicates that the incremented pointer will be used as the address to access a desired location in the local buffers.

*((Ptr++)+CTR): This addressing mode increments the specified pointer and add a value in a specified counter (CTR) to the incremented pointer.

*((Ptr++)+CTR+offset): This addressing mode is the same as the previous addressing mode except that an offset is added to the value of the specified pointer in addition to the value in the counter. The offset is provided as a field (HOFF[3:0], VOFF[3:0]) in the VLIW instruction.

*((Ptr++)+ZLUT(CTR)+offset): The Z-look-up table addressing mode is the same as the previous addressing mode.

*(2DPtr): This is a two-dimensional addressing mode and will be discussed below with respect to the effective address generation circuit 750.

For two dimensional addressing, the image processing procedure 750 will store a vertical count value (vcounter) in the one of the counters 742 and a horizontal count value (hcounter) in another counter 742. The image processing procedure 750 will also store a predefined configuration settings in one of the pointer configuration registers that specifies horizontal dimension (hdimension), the horizontal counter selection (HCNTRSEL) bits, the vertical counter selection (VCNTRSEL) bits, byte addressing (BYTE), unsigned addressing (UNSIGNED) and the buffer level (BUFLVL). The image processing procedure will then store a base pointer value in one of the pointer registers 710 and a pointer configuration value in the associated pointer configuration register. The pointer configuration value specifies which of the pointer set configuration registers to use. For example, if the value in the specified pointer configuration register is equal to two, multiplexor 738 will provide the fields from pointer set configuration register two (PCFG2) to the effective address generation circuit. After defining these initial conditions, instructions may be executed that perform the two-dimensional addressing. In this way, by changing the horizontal and vertical offset in the instructions image data in the local buffers can be accessed in a complex and efficient manner.

The VLIW instruction has fields that specify a horizontal offset (hoff[3:0]) and a vertical offset (voff[3:0]). The effective address generation circuit 750 generates the effective address using the following relationship:

Effective address=*Ptr*+((*vcounter*+*voffset*)\**hdimension*)+(*hcounter*+ *hoffset*).

To generate the two-dimensional effective address, the VLIW instruction includes a field that sets the value of the IPTR[1:0] bits to select one of the pointers and pointer configuration registers, a field that specifies the horizontal offset (hoff[3:0]) and another field that specifies the vertical offset (voff[3:0]).

The vertical and horizontal selection signals, VCNTRSEL [1:0] and HCNTRSEL[1:0], cause counter selection multiplexors, 744 and 746, respectively, to output the value stored in the selected counter. An adder 748 adds the vertical offset (voff[3:0]) to the value of the selected vertical counter. A multiplier 750 multiplies output of the adder 748 by the value of the horizontal dimension (HDIMEN[9:0]). For two-dimensional addressing, a first 2-D bit 750 will be equal to one to allow the AND gate 752 to provide the output the output of the multiplier. For other than two-dimensional addressing, the first 2-D bit 750 is set equal to zero and provides an output of zero.

Meanwhile, another AND gate 754 performs an AND operation between the value of selected horizontal counter from multiplexor 746 and a 2-D/counter bit 755. Since the 2-D bit is equal to one for two-dimensional addressing and for *(Ptr+Ctr) addressing, AND gate 754 provides the value of the selected horizontal counter. When the 2-D bit/counter bit 755 is equal to zero, AND gate 754 outputs a zero. Another adder 756 adds the value of the selected horizontal counter to the horizontal offset (HOFF[3:0]). Multiplexor 758 is enable to pass the output of adder 756 to another adder 760 which outputs the following result:

((*vcounter*+*voffset*)\**hdimension*)+(*hcounter*+*hoffset*).

A pointer mode bit 762 is set equal to one, and AND gate 764 allows the output of adder 760 to be stored in latch 759*a* Another latch 759*b* latches the output of multiplexor 758. The outputs of latches 759*a* and 759*b* are supplied to adder 766. Adder 766 adds the specified base address from the specified pointer register 710 to the output of adder 760 to generate the two-dimensional effective address. Multiplexor 768 supplies the two-dimensional effective address as a byte address to the local buffers in response to BYTE/SHORT bit of the selected pointer set configuration register 736.

Shifter 769 shifts the output of adder 766 up by one, effectively multiplying the output of adder 766 by two. The multiplexor 768 outputs the result of the shifter 769 when the BYTE/SHORT bit indicates short.

In an alternate embodiment, latch 762 and "AND-gate" 764 are not used; and the output of adder 760 is supplied directly to adder 766.

Because two cycles, phases two and three, are used to generate the effective address, latches 759*a* and 759*b* store intermediate results of the effective address generation of phase two, for use in phase three. At the end of phase three, an incrementer 770 increments the value of IPTR[9:0] pointer by 1. The incrementing is performed during phases four or five and the incremented value is stored back in the specified IPTR register.

Convolutional Filters

Detection of the condition ((hcounter+hoffset) >hdimension) in a given instruction for a given 2-dimensional pointer causes the SIMD master controller 450 to direct all the SIMD local buffer accesses to the next higher bank. When this condition occurs during read operations, processing element zero fetches data from the local buffers of bank one, and more generally, processing element N fetches data from bank N+1. When this condition occurs during write operations, processing element zero writes data to the local buffers of bank one, and more generally, processing element N writes data to bank N+1. A comparator 770 receives the value (hcounter+hoffset) from adder 756 and compares it to the value of HDIMEN[9:0] to generate a comparison signal that indicates when the condition, ((hcounter+hoffset)>hdimension), is true.

Z-Look-Up Table Mapped Addressing

The two-hundred fifty-six by eight-bit look-up table 696 provides an additional addressing mode that can be selected by the pointer set configuration registers. The z-look-up mode allows the local buffers to be accessed by the image processing procedure in any preconfigured order. For example, the z-look-up mode can be used for the JPEG zig-zag sort or any other address mapping of eight bit. In the z-look-up addressing mode, the effective address is determined by the following relationship: Effective Address=Ptr+ ZLUT[counter]. When the Z-LUT selection signal indicates that the Z-look-up mode is enabled, multiplexor 772 outputs a value from the Z-look-up table 696 as specified by the selected counter 742. Adder 774 adds the value from the Z-LUT 696 to the output of adder 756.

SIMD Processing Element

Figure 19:
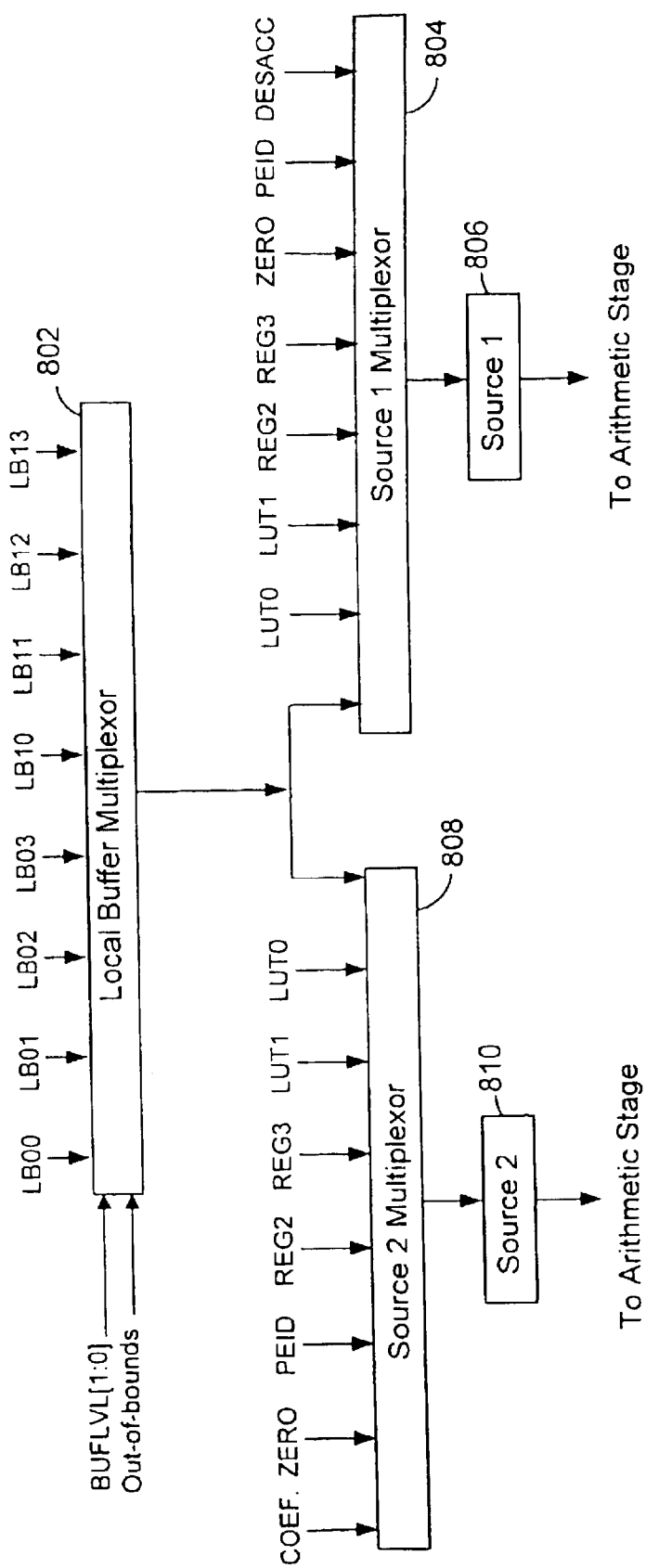
FIG. 19 is a block diagram of a multiplexor/latch stage of the SIMD processor pipeline of FIG. 15.

In FIG. 19, the multiplexor/latch stage 682 (FIG. 15) of phase four in an exemplary SIMD processing element is shown. A local buffer multiplexor 802 selects an output from one of the local buffers based on BUFLVL[1:0] (FIG. 17) and the out-of-bounds signal from FIG. 18. When the out-of-bounds signal is set, the local buffer multiplexor 802 selects one of the local buffers from the adjacent bank. In FIG. 19, the local buffer multiplexor for bank 0 is shown; the other local buffer multiplexors for the processing elements in the other banks are configured in the same manner.

The VLIW in phase 4, a source one multiplexor 804 may supply the data from one of the local buffers, data from look-up table zero (LUT0), data from look-up table one (LUT1), data from register two of the processing element (REG2), data from register three (REG3) of the processing element, a zero input, data from a processing element (PEID), or from a descale accumulator (DESACC) to a source 1 latch 806.

In the VLIW in phase 4, a source two multiplexor 808 may supply the data from one of the local buffers, data from look-up table zero (LUT0), data from look-up table one (LUT1), data from register two of the processing element (REG2), data from register three (REG3) of the processing element, a zero input, data from a processing element (PEID), or from the coefficient memory to the source 2 latch 810.

Figure 20:
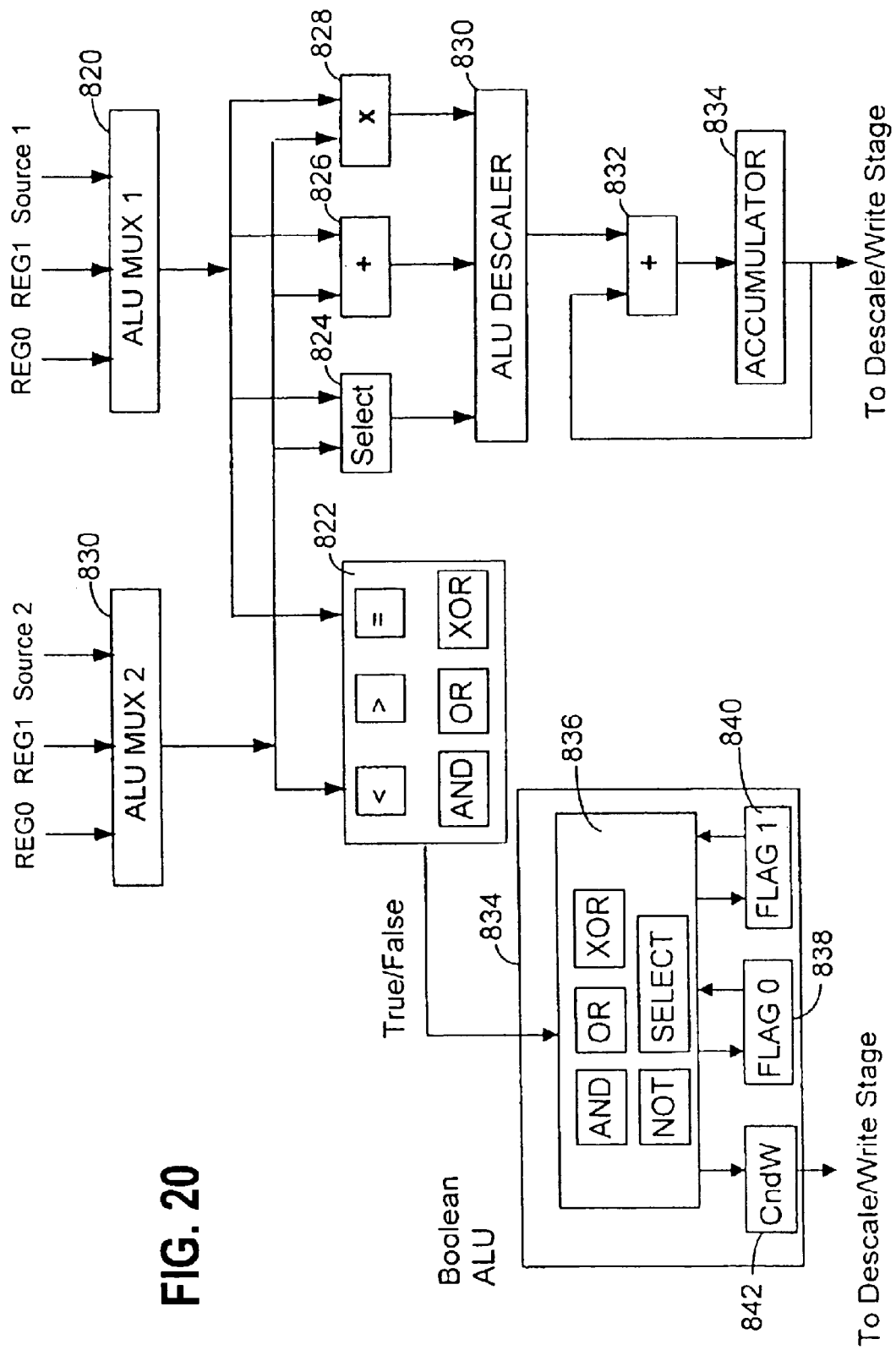
FIG. 20 is a block diagram of an arithmetic stage of the SIMD processor pipeline of FIG. 15.

In FIG. 20, in an exemplary processing element arithmetic stage 684 of phase five of FIG. 15 is shown. A first arithmetic logic unit (ALU) multiplexor (ALU MUX 1) 820 supplies either the value from processing element register zero (REG0), processing element register one (REG1) or the source one latch 806 (Source 1) (FIG. 19) to a logic function circuit 822, a selector 824, an adder 826 and a multiplier 828. A second ALU multiplexor (ALU MUX 2) 830 supplies either the value from processing element register zero (REG0), processing element register one (REG1) or the source two latch (Source 2) 810 (FIG. 19) to the logic function circuit 822, the selector 824, the adder 826 and the multiplier 828.

The output of the selector 824, the adder 826 and the multiplier 828 is supplied to an ALU descaler 830 in accordance with the VLIW. The ALU descaler 830 will be described below. An adder 832 adds the output from the ALU descaler 830 to the value stored in the accumulator 834, if specified in the VLIW, and supplies the sum to the descale/write stage 686 (FIG. 15).

In the logic function circuit 822, a true/false signal is generated based on a selected function that is applied to the outputs of the first and second ALU multiplexors, 820 and 830, respectively, in accordance with the VLIW. The selected functions include a greater than function, a less than function, an equals function, and the logical AND, OR and exclusive-or (XOR) functions.

The true/false signal output by the logic function circuit 822 is supplied to a boolean accumulator 834. In the boolean accumulator 834, the true/false signal is supplied to another logic function generator 836. Flag bit zero (FLAG 0) and Flag bit one (FLAG 1) are also into to the logic function generator 836. The logic function generator 836 stores the result of the specified logic operation in FLAG 0 or FLAG 1 in accordance with the VLIW. The logic function generator 836 also stores the result of the specified logic operation in a conditional write bit 842 which is supplied to the descale/write stage. The logic function generator 836 has circuits that perform any of the following logic operations in accordance with the VLIW: AND, OR, XOR, NOT, and SELECT.

Figure 21:
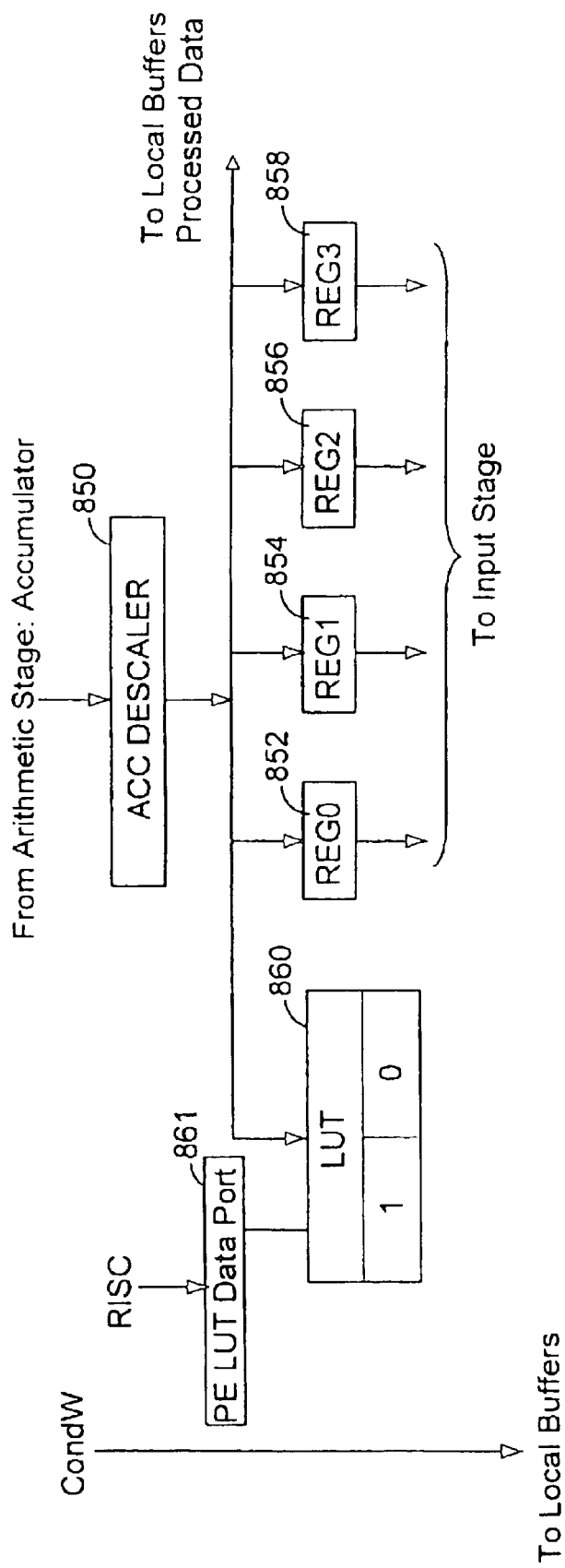
FIG. 21 is a block diagram of a descale/write stage of the SIMD processor of FIG. 15.

In FIG. 21, the processing element descale write stage 686 of phase six, of FIG. 15 is shown. The output from the accumulator 834 (FIG. 20) is supplied to an accumulator (ACC) descaler 850 before being stored in one of the processing element registers: register zero (REG0) 852, register one (REG1) 854, register two (REG2) 856 or register three (REG3) 858 in accordance with the VLIW. The output from the ACC descaler 850 can also be stored in the local buffers in accordance with the VLIW.

Each processing element includes a two-hundred fifty-six by sixteen look-up table 860 in memory. The look-up table 860 is divided into two eight-bit tables, look-up table A (LUTA) and look-up table B (LUTB), each of which makes it possible to look up or transform an eight-bit value to any other eight-bit value. When LUTA or LUTB are selected as destinations for a given arithmetic instruction, selection of the ALU data bits that address the look-up table is determined by the descale configuration set specified in the instruction. The eight-bit lookup table result can be signed or unsigned depending on the source specified. The RISC loads the look-up table 861 via LUT data port 861.

Figure 22:
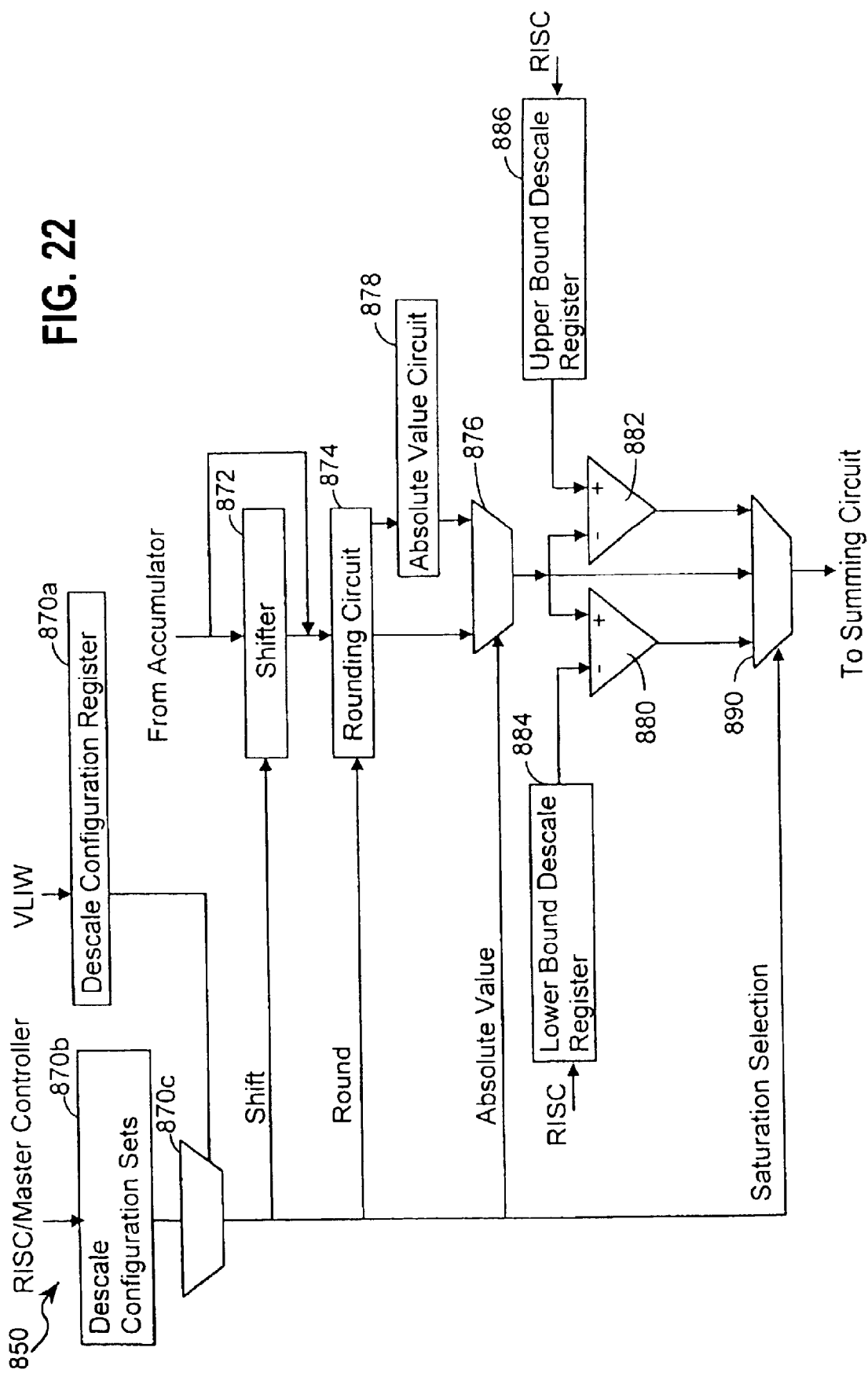
FIG. 22 is a block diagram of an accumulator descaler of the arithmetic stage of the processing element of FIG. 21.

In FIG. 22, the ACC descaler 850 of FIG. 21 is shown. The microprocessor (RISC) or SIMD master controller 450 configures at least one of eight descale configuration set registers 870b. The VLIW supplies a value to a descale configuration register 870 which causes a multiplexor 860c to output the values stored in the selected descale configuration set register to supply the control signals to a shifter 872 and a rounding circuit 874. A multiplexor 876 output either the rounded value from the rounding circuit 874 or the absolute value from the absolute value circuit 878.

Lower and upper comparators, 880 and 882, compare the output of multiplexor 878 to the values in the lower bound descale register 884 and the upper bound descale register 886, respectively. In accordance with the VLIW and the result of the comparison, the value in the lower or upper descale register, or the output of multiplexor 878 is output.

Figure 23:
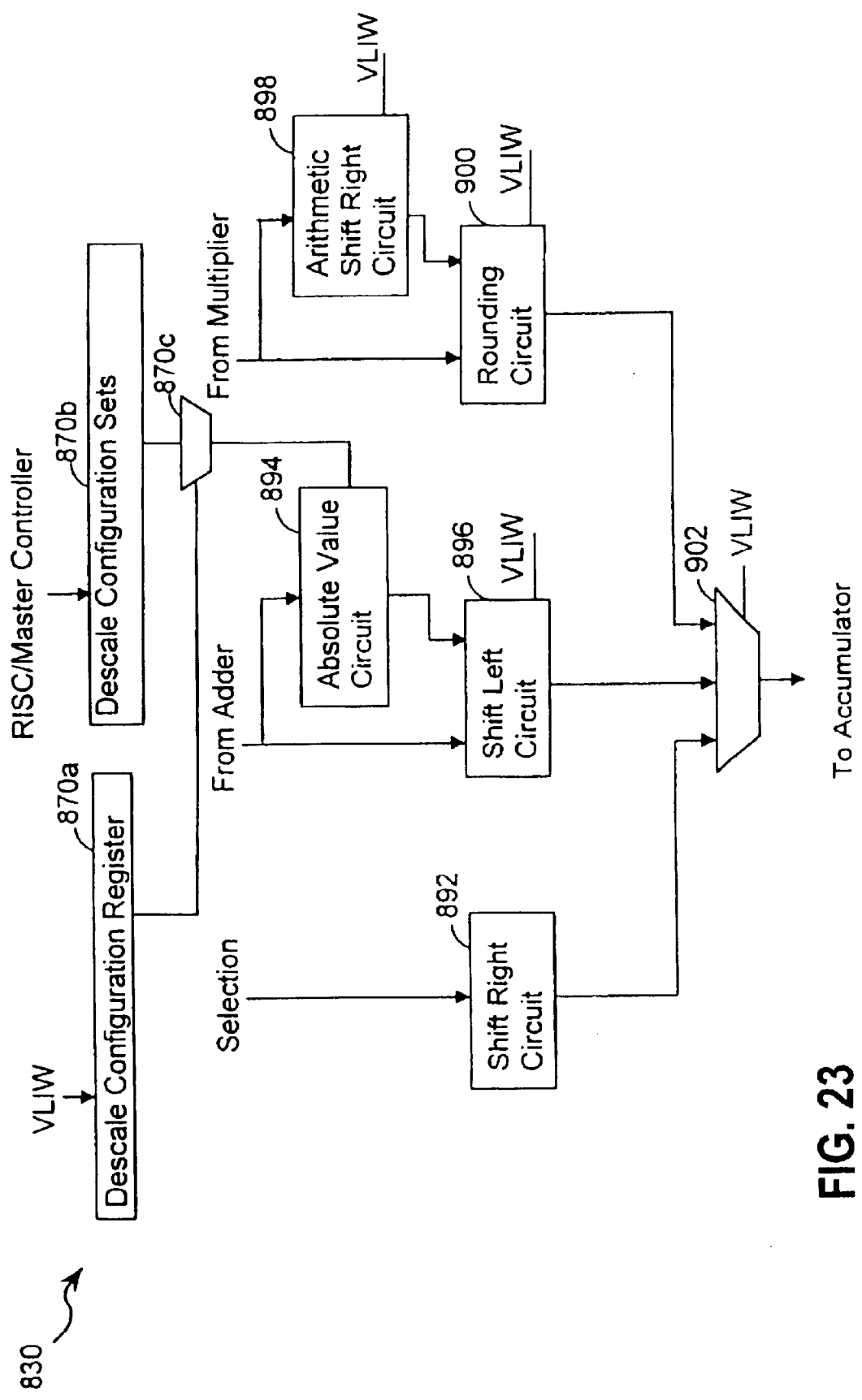
FIG. 23 is a block diagram of an arithmetic logic unit descaler of the arithmetic stage of the processing element of FIG. 20.

In FIG. 23, in an ALU descaler 839 is shown. T ALU descaler descales the values output from the selector 824, the adder 826 and the multiplier 828 in response to the VLIW. The absolute value circuit 894 operates in accordance with one of the descale configuration set registers 870b specified by the descale configuration register 870a. The multiplexor 870c outputs the values of the selected descale configuration set register. A shift right circuit 892 shifts the output of the selector 824. An absolute value circuit 894 provides the absolute value of the value output by the adder 826. A shift left circuit 896 shifts either the value output by the adder or the value output by the absolute value circuit 894 in accordance with the VLIW.

An arithmetic shift right circuit 898 shifts the value output by the multiplier in accordance with the VLIW. A rounding circuit 900 rounds either the value output by the arithmetic shift right circuit 898 or the value output by the multiplier in accordance with the VLIW.

A multiplexor 902 supplies the output from the shift right circuit 892, the shift left circuit 896 or the rounding circuit 900 to the accumulator in accordance with the VLIW. The shift left circuit 896 and rounding circuit 900 include multiplexors that are responsive to the control signals from the descale configuration set register to select a specified one of the two inputs.

Figure 24:
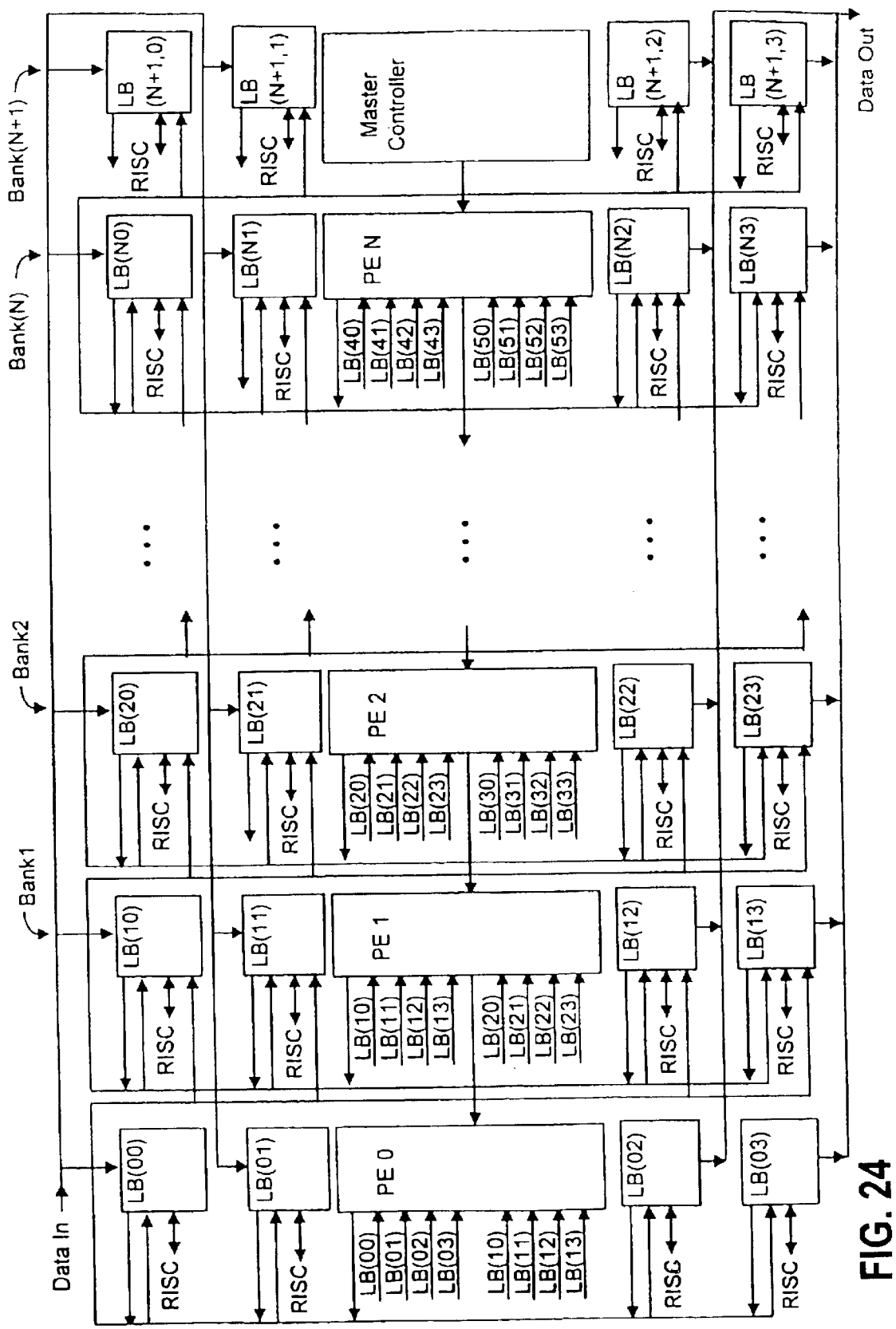
FIG. 24 is a block diagram showing the expandable topology of the arithmetic processing block of FIG. 6.

In FIG. 24, a general topology of the SIMD master controller 450 of FIG. 4 is shown. In this architecture, any number N of banks can be added, making the architecture expandable by adding additional banks with processing elements.

Figure 25:
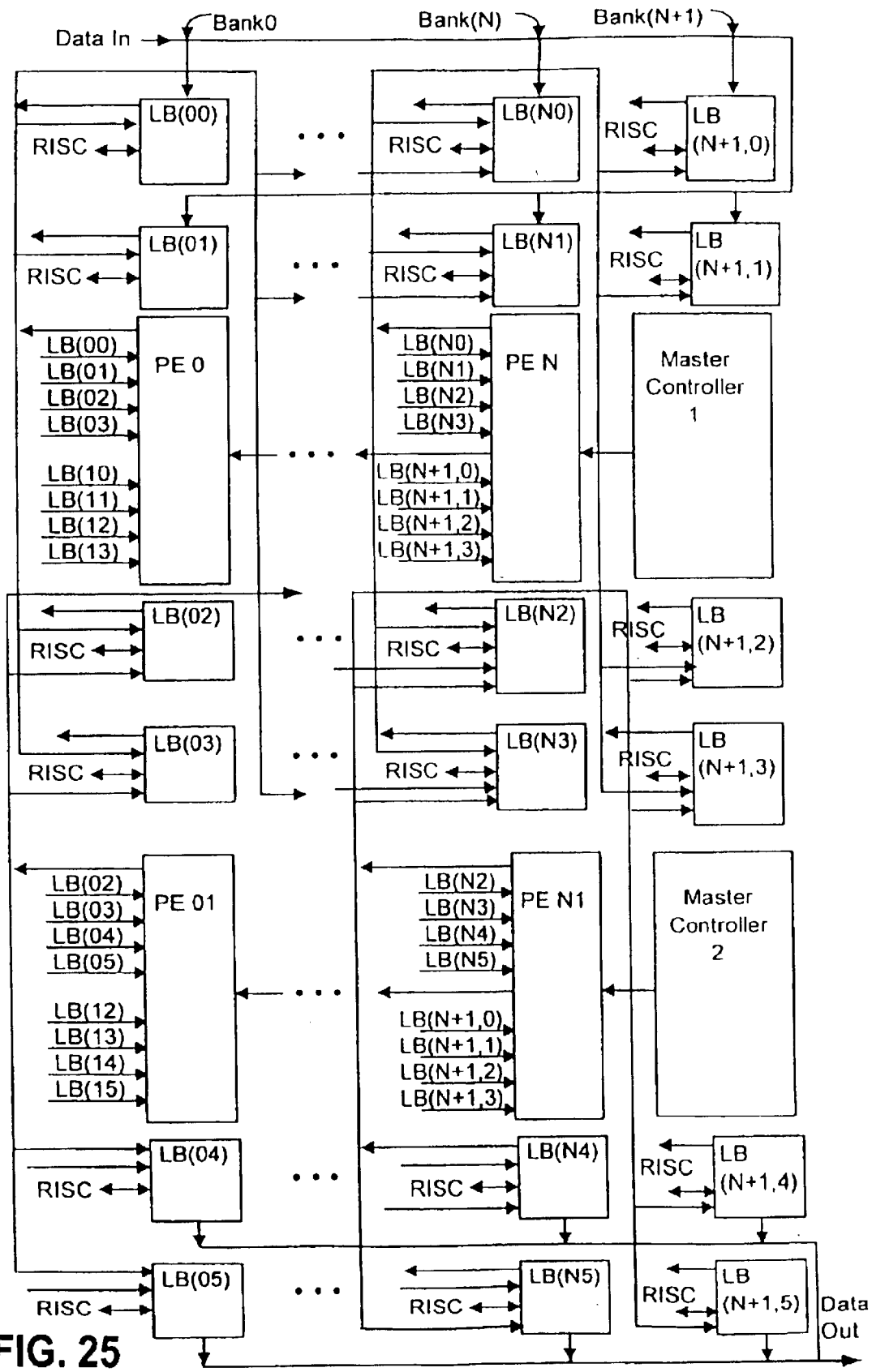
FIG. 25 is a block diagram of an arithmetic processing block of FIG. 6 having multiple master controllers.

In FIG. 25, a general topology of the SIMD master controller of FIG. 24 with a second SIMD master controller. Additional levels of local buffers are added between the master controllers allowing the master controllers to exchange data using those local buffers. Each master controller has the architecture shown in FIG. 16.

SIMD Instruction Set

The arithmetic and logical instructions use a VLIW having a fixed format. Table three below shows the format of the VLIW. Line one shows the fields and line 2 shows the number of bits in that field. The dashes "—" indicate that those bits are shared between the adjacent fields.

TABLE 3

VLIW for SIMD processor

| OPCODE | ALUOP | DESCFG | DESTOP | --- | SOURCE OP (for Source 2) | SOURCE OP (for Source 1) |
|---|---|---|---|---|---|---|
| 6 | 5 | 3 | 8 | 3 | 7 | 10 |

The VLIW supports and operation code (OPCODE), ALU operation select (ALUOP), a descale configuration select (DESCFG), a destination operand (DESTOP), three shared bits, a source operand (SOURCE OP) for Source 2 and a source operand (SOURCEOP) for Source 1.

The ALUOP field selects the ALU operation to be performed and is encoded as shown in table four below. In table four, ADEST indicates that arithmetic destination operations are used, not the binary accumulator operands (BACCA or BACCB). DEST indicates any destination operand—both arithmetic and boolean. The source one and source two operands are designated as SRC1 and SRC2, respectively. Th syntax of the operation is shown using C-pseudo-code. Some ALU opcodes (ALUOP) perform two operations simultaneously. The ^^ operand performs a squaring operation on source operand one. Any value source one operand may be used for squaring except LSI.

TABLE 4

Arithmetic Instructions

| ALUOP | OP TYPE | SYNTAX |
|---|---|---|
| 00000 | ARITH | ADEST = SRC1 * SRC2 |
|  | ARITH | ADEST += SRC1*SRC2 |
| 00001 | ARITH | ADEST = SRC1 + SRC2 |
|  | ARITH | ADEST += SRC1 - SRC2 |
| 00010 | ARITH | ADEST = SRC1 - SRC2 |
|  | ARITH | ADEST += SRC1 - SRC2 |
| 00011 | ARITH | ADEST = SRC1^^2 |
|  | ARITH | ADEST += SRC1^^2 |
| 01100 | BITWISE | ADEST = SRC1 & SRC2 |
| 01101 | BITWISE | ADEST = SRC1 \| SRC2 |
| 01110 | BITWISE | ADEST = SRC1^SRC2 |
| 10000 | SELECT | ADEST = BACCA ? SRC1 :SRC2 |
|  | CONDI-TIONAL | ADEST = SRC1 IF BACCA |
| 10001 | SELECT | ADEST = BACCB ? SRC1 :SRC2 |
|  | CONDI-TIONAL | ADEST = SRC1 IF BACCB |
| 10010 | SELECT | ADEST = !BACCA ? SRC1 :SRC2 |
|  | CONDI-TIONAL | ADEST = SRC1 IF !BACCA |
| 10011 | SELECT | ADEST = !BACCB ? SRC1 :SRC2 |
|  | CONDI-TIONAL | ADEST = SRC1 IF !BACCB |
| 10100 | SELECT | ADEST = !BACCA && !BACCB ? SRC1 :SRC2 |
|  | CONDI-TIONAL | ADEST = SRC1 IF !BACCA && !BACCB |
| 10101 | SELECT | ADEST = !BACCA && BACCB ? SRC1 :SRC2 |
|  | CONDI-TIONAL | ADEST = SRC1 IF !BACCA && BACCB |
| 10110 | SELECT | ADEST = BACCA && !BACCB ? SRC1 :SRC2 |
|  | CONDI-TIONAL | ADEST = SRC1 IF BACCA && !BACCB |
| 10111 | SELECT | ADEST = BACCA && BACCB ? SRC1 :SRC2 |
|  | CONDI-TIONAL | ADEST = SRC1 IF BACCA && BACCB |

TABLE 4-continued

Arithmetic Instructions

| ALUOP | OP TYPE | SYNTAX |
|---|---|---|
| 11000 | SELECT | DEST = SRC1 > SRC2 ? SRC1 :SRC2 |
|  | CONDI-TIONAL | ADEST = SRC1 IF SRC1 > SRC2 |
| 11001 | SELECT | DEST = SRC1 < SRC2 ? SRC1 :SRC2 |
|  | CONDI-TIONAL | ADEST = SRC1 IF SRC1 < SRC2 |
| 11010 | SELECT | DEST = SRC1 >= SRC2 ? SRC1 :SRC2 |
|  | CONDI-TIONAL | ADEST = SRC1 IF SRC1 >= SRC2 |
| 11011 | SELECT | DEST = SRC1 <= SRC2 ? SRC1 :SRC2 |
|  | CONDI-TIONAL | ADEST = SRC1 IF SRC1 <= SRC2 |
| 11100 | SELECT | DEST = SRC1 == SRC2 ? SRC1 :SRC2 |
|  | CONDI-TIONAL | ADEST = SRC1 IF SRC1 == SRC2 |

Select operations are performed based on the result of the comparison or test, with source operand one being written to the destination if the result of the comparison or test is true, and source operand two being written to the destination if the result of the comparison or test is false. The arithmetic accumulator, ACC, is always updated with the result of the select. When any select operation is performed with a boolean accumulator as the destination, the boolean result of the comparison is sent to the specified accumulator.

A conditional write mode is provided for all comparison and test operations. Conditional writes operate in exactly the same manner as the select operations described above, except that if the result of the comparison or test is false, then the output operand is not written. However, the arithmetic accumulator is always written, exactly as it would have been for the corresponding select operation. This allows if-else and case constructs to be built using a sequence of ifs. The conditional write instructions are encoded identically to their select counterparts, except for the opcode field.

Each processing element has a sixteen-by-sixteen signed multiplier, an accumulator, a four-element register file, a sixteen bit comparator, and two LUTs for data mapping. All the processing elements execute the same instruction simultaneously in lock-step. Additionally, the image transform processor can be implemented as an integrated circuit, or the processing elements can be implemented using discrete components. Although the image transform processor has been described for use with an exemplary electronic digital still camera, the image transform processor can be used with a variety of electronic digital video cameras, scanners and printers. In addition, the present invention can be used with portable electronic devices having an image sensor such as a personal digital assistant (PDA).

In FIG. 26, a flow diagram of an exemplary image transform process of the image transform processor 206 of FIG. 4 is shown. A image is created by a device such as a digital camera with a CCD or a digital image located in a memory or storage device and made available as and input image at the start of the image transform process 2600. A first portion of the input image is provided to a buffer in a plurality of buffers 2602. The plurality of buffers are locations in memory that act as temporary storage. A first processing operation is performed on the first portion of the input image resulting in a first processed image data portion 2604. An example of a first processing operation is uncompressing or formatting the first portion of the input image. The first processed image data portion is stored in a second buffer in the plurality of buffers 2606.

A second portion of the input image is provided in the first buffer 2608. The first portion of the input image is written over by the second portion of the input image or erased prior to being provided to the first buffer. A second processing operation is performed on the first processed image data portion resulting in a second processed image data portion 2610. An example of a second processing operation is to adjust the color contrast of the first processed image data portion. The second processed image data portion is stored in a third buffer of the plurality of buffer 2612. The first processing operation on the second portion of the input image is performed resulting in a third processed image data portion 2614. The first processing operation and the second processing operation are shown occurring linearly in time. In alternate embodiments the order of the first processing operation and second processing operation may occur in any order once input image portions are available. In a preferred embodiment both operations occur simultaneously.

The third processed image data portion is stored in the second buffer 2616 and the second processed image data portion is provided on a data path as output image data 2618. If additional input image portions are available 2620, then processing continues at 2602. If no additional input image portions are available 2620, then processing is complete 2620 and the output image has been transformed from the input image.

The programmable image transform processor may also be implemented in software. Modeling the activities of a microprocessor in software is generally known by those skilled in the art. Therefore, an exemplary implementation of the programmable image transformation processor may also be modeled in software using machine readable instructions. An embodiment of the method steps employs at least one machine-readable signal bearing medium having machine-readable instructions. Examples of machine-readable signal bearing mediums include computer-readable mediums, such as a magnetic storage medium (i.e. floppy disks, or optical storage like a compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EEPROM), or equivalent. Note that the computer-readable medium could even be a paper or another suitable medium upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented utilizing a programming language, comprising an ordered listing of executable instructions for implementing logical functions, can be embodied in any machine-readable signal bearing medium. The ordered listing of executable instructions for implementing logical functions utilize by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

While various embodiments of the invention have been described, it will be apparent to those of ordinary skill in the art that many more embodiments and implementations are possible that are within the scope of this invention.

What is claimed is:

1. An image transform processor for processing image data, comprising:

a programmable arithmetic processor capable of receipt of the image data from a data source over a data path and processing the image data, the programmable arithmetic processor comprising a first set of local buffers and a second set of local buffers, each buffer in the first set of local buffers alternately used for fetching input image data and each buffer in the second set of local buffers alternately used for storing output image data; and a programmable input addresser that controls transfer of the image data from the data source to the programmable arithmetic processor by providing a source address onto a source address path, the source address identifying the data source.

2. The image transform processor of claim 1, wherein the programmable input addresser further controlling transfer of the image data to the programmable arithmetic processor by providing a storage address to the programmable arithmetic processor, the storage address identifying a location within the programmable arithmetic processor for storage of the image data.

3. The image transform processor of claim 1, wherein the data source being a frame capture processor, the source address identifying the frame capture processor.

4. The image transform processor of claim 1, wherein the data source being a memory, the source address being a memory address identifying a location of the image data within the memory.

5. The image transform processor of claim 1, wherein the data source being a memory, the source address path being a read address bus coupled between the programmable input addresser and the memory, the source address being a memory address identifying a location of the image data within the memory.

6. The image transform processor of claim 1, the storage location within the programmable arithmetic processor being a local buffer.

7. The image transform processor of claim 1 further comprising:

a programmable output addresser controlling transfer of the image data from the programmable arithmetic processor to a memory by providing a write address onto a write path, the write address identifying a write address in the memory for storage of the image data.

8. The image transform processor of claim 7, wherein the write path is a write address bus electrically connected to the programmable output addresser and the memory.

9. The image transform processor of claim 7, wherein the programmable output addresser further controlling transfer of the image data by providing a retrieval address to the programmable arithmetic processor, the retrieval address identifying a location within the programmable arithmetic processor for retrieval of the image data.

10. The image transform processor of claim 9, wherein the retrieval location within the programmable arithmetic processor is a buffer.

11. The image transform processor of claim 9, wherein the retrieval location within the programmable arithmetic processor is at least one buffer of a plurality of buffers.

12. An image transform processor for processing image data, the image transform processor comprising:
  a programmable arithmetic processor capable of receiving the image data from a memory over a data bus coupled between the programmable arithmetic processor and the memory and processing the image data, the programmable arithmetic processor comprising a first set of local buffers and a second set of local buffers, each buffer in the first set of local buffers alternately used for fetching input image data and each buffer in the second set of local buffers alternately used for storing output image data; and
  a programmable input addresser controlling transfer of the image data from the memory to the programmable arithmetic processor by:
    (i) providing a memory address onto a read address bus coupled between the programmable input addresser and the memory, the memory address identifying a location of the image data within the memory, and
    (ii) providing a storage address to the programmable arithmetic processor, the storage address identifying a local buffer within the programmable arithmetic processor for storage of the image data.

13. An image transform processor for processing image data, comprising:
  a programmable arithmetic processor capable of receiving the image data from a memory over a data bus coupled between the programmable arithmetic processor and the memory and processing the image data, the programmable arithmetic processor comprising a first set of local buffers and a second set of local buffers, each buffer in the first set of local buffers alternately used for fetching input image data and each buffer in the second set of local buffers alternately used for storing output image data;
  a programmable input addresser controlling transfer of the image data from the memory to the programmable arithmetic processor by:
    (i) providing a memory address onto a read address bus coupled between the programmable input addresser and the memory, the memory address identifying a location of the image data within the memory, and
    (ii) providing a storage address to the programmable arithmetic processor, the storage address identifying a first local buffer within the programmable arithmetic processor for storage of the image data; and
  a programmable output addresser controlling transfer of the image data from the programmable arithmetic processor to the memory by:
    (i) providing a write address onto a write address bus coupled between the programmable output addresser and the memory, the write address identifying a write address in the memory for storage of the image data, and
    (ii) providing a retrieval address to the programmable arithmetic processor, the retrieval address identifying a second local buffer within the programmable arithmetic processor for retrieval of the image data.

14. An image transform processor comprising:
  a programmable input addresser to retrieve an image as a received image in accordance with a first programmed predefined access pattern, the programmable input addresser to output the received image in accordance with a second programmed predefined access pattern;
  a programmable output addresser;
  a SIMD processor including a controller coupled to a memory storing an at least one image processing instructions, the SIMD processor having a plurality of processing elements and a plurality of local buffers arranged in a plurality of levels and a plurality of processing banks, each processing bank in the plurality of processing banks being connected in parallel with another processing banks in the plurality of processing banks, the controller being coupled to each processing element in the plurality of processing elements and each local buffer in the plurality of local buffers to control the operation of each processing element and each local buffer such that the plurality of processing banks simultaneously respond to an instruction from the controller, the SIMD processor being arranged as:
    (i) a first level of the plurality of levels including a first set of local buffers from the plurality of local buffers;
    (ii) a second level of the plurality of levels including a second set of local buffers from the plurality of local buffers;
    (iii) a third level of the plurality of levels including a third set of local buffers from the plurality of local buffers;
    (iv) a fourth level of the plurality of levels including a fourth set of local buffers from the plurality of local buffers;
    (v) a processing level including a set of processing elements from the plurality of processing elements that generates a processed image from the image stored in the plurality of local buffers in accordance with an image processing instruction;
  each processing bank including one local buffer of the first set of local buffers, one local buffer of the second set of local buffers, a processing element from the set of processing elements, one local buffer of the third set of local buffers, and one local buffer of the fourth set of local buffers, the processing element of each processing bank storing and retrieving the image in response to the image processing instruction;
  where the processing element associated with each processing bank directly read from and store to the local buffers of an adjacent processing bank, if any;
  each processing bank receiving an image from the programmable input addresser via the first set of local buffers, each processing bank also receiving the image from an input block addresser via the second set of local buffers, each processing bank outputting the processed image to the programmable output addresser via the third set of local buffers, each bank also sending the processed image to the programmable output addresser via the fourth set of local buffers;
  where the image processing instruction include an instruction that selectively designate one of the group consisting of the first level and the second level to receive the image from the programmable input block addresser as a selected input level, and a non-selected input level, such that simultaneously the selected input level receives the image while the processing element processes the image from the non-selected input level;

where the image processing instruction include an instruction that selectively designate one of the group consisting of the third level and the fourth level to output the processed image to an output block addresser as a selected output level, and a non-selected output level, such that simultaneously the selected output level sends the processed image data while the processing element processes the image from the non-selected output level; and the programmable output addresser to receive the processed image from the selected output level, the output block addresser to output the processed image in accordance with a programmed predefined output pattern.

15. The image transform processor of claim 14 further comprising:

a Huffman decoder that decodes a encoded image into the image prior to sending the image to the SIMD processor; and a Huffman encoder that encodes the image from the SIMD processor.

16. The image transform processor of claim 15 further comprising:

one or more Huffman control registers that causes the Huffman decoder to receive the encoded image, decode the encoded image to produce the image, and to provide the image to the SIMD processor, and that causes the Huffman encoder to receive the processed image from the SIMD processor, encode the processed image and output the encoded processed image.

17. The image transform processor of claim 14 wherein the SIMD processor further comprises:

a boolean accumulator that has a boolean flag, the controller having a conditional write instruction that overwrites a value in the local buffers based on a state of the boolean flag.

18. The image transform processor of claim 14, wherein each processing element includes a boolean accumulator that has a boolean flag, the controller causing the processing element to store a result of a comparison operation in the respective boolean flag.

19. The image transform processor of claim 14 wherein the SIMD processor further comprises:

a base pointer register that stores a base address (BA);

a horizontal counter configuration register that stores a horizontal count (Hcount);

a vertical counter configuration register that stores a vertical count (V count); and a row configuration register that stores the length a row (Hdim), where the controller is responsive to an instruction that specifies a horizontal offset (Hoft) and a vertical offset (Voft), the controller generating an effective two-dimensional address (EA) to the input buffers and the output buffers in accordance with the following relationship:

$$EA=BA+((V\ count+V\ oft)*Hdim)+(Hcount+Hoft).$$

20. The image transform processor of claim 14 further comprising:

an auxiliary bank including:
one local buffer of the first set of local buffers;
one local buffer of the second set of local buffers; and
one local buffer of the third set of local buffers, where the auxiliary bank is adjacent an end processing bank of the processing banks, the end processing bank directly reads data from and stores data to the local buffers of the auxiliary bank.

21. An image transform processor comprising:

a programmable input block addresser to retrieve image data in accordance with a first programmed predefined access pattern as retrieved image data;

a SIMD processor including a controller coupled to a memory storing a image processing instruction, the SIMD processor having processing elements and local buffers arranged in levels and processing banks, each processing bank being connected in parallel with other processing banks, the controller being coupled to each processing element and local buffer to control the operation of each processing element and local buffer such that the processing banks simultaneously respond to the same instruction from the controller, the SIMD processor being arranged as:

(i) a first level including a first set of local buffers;
(ii) a second level including a second set of local buffers;
(iii) a processing level including a set of processing elements that generates processed image data from image data stored in the local buffers in accordance with the image processing instructions;
(iv) a third level of a third set of local buffers;
(v) a fourth level of a fourth set of local buffers;

a programmable input buffer controller to store the retrieved image data in a specified level of the local buffers in accordance with a second programmed predefined access pattern;

where in the SIMD processor:

each bank including one local buffer of the first set of local buffers, one local buffer of the second set of local buffers, one processing element from a set of processing elements, one local buffer of the third set of local buffers, and one local buffer of the fourth set of local buffers, the processing element of each bank storing and retrieving image data from the local buffers in response to the instructions;

where the processing elements of the processing banks directly read data from and store data to the local buffers of an adjacent processing bank, if any;

each bank receiving image data from the input block addresser via the first set of local buffers, each bank also receiving image data from the input block addresser via the second set of local buffers, each bank outputting the processed image data to the output block addresser via the third set of local buffers, each bank also sending the processed image data to the output block addresser via the fourth set of local buffers;

where the image processing instructions include instructions that selectively designate one of the group consisting of the first level and the second level to receive image data from the input block addresser as a selected input level, the other level being a non-selected input level, such that simultaneously the selected input level receives image data while the processing element processes image data from the non-selected input level; and where the image processing instructions include instructions that selectively designate one of the group consisting of the third level and the fourth level to output the processed image data to the output block addresser as a selected output level, the other level being a non-selected output level, such that simultaneously the selected output level sends the processed image data while the processing element processes image data from the non-selected output level; and a programmable output buffer controller to cause the local buffers of the selected output level to output the processed image in accordance with a third programmed predefined access pattern as output image data; and a programmable output block addresser to generate addresses to output the output image data in accordance with a fourth predefined access pattern.

22. An image transform processor for processing image data, comprising:

a means capable of receipt of the image data from a data source over a data path and processing the image data; and a means that controls transfer of the image data from the data source to a programmable arithmetic processing means by providing a source address onto a source address path, the source address identifying the data source, the programmable arithmetic processing means comprising a first set of local buffers and a second set of local buffers, each buffer in the first set of local buffers alternately used for fetching input image data and each buffer in the second set of local buffers alternately used for storing output image data.

23. The image transform processor of claim 22 further comprising:

a means for controlling transfer of the image data from the programmable arithmetic processor to a memory by providing a write address onto a write path, the write address identifying a write address in the memory for storage of the image data.

24. An image transform processor for processing image data, the image transform processor comprising:

a means capable of receiving the image data from a memory over a data bus coupled between a programmable arithmetic processing means and the memory and processing the image data; and a means for controlling transfer of the image data from the memory to the programmable arithmetic processing means by:

(i) means for providing a memory address onto a read address bus coupled between a programmable input addressing means and the memory, the memory address identifying a location of the image data within the memory, and (ii) means for providing a storage address to the programmable arithmetic processing means, the storage address identifying a local buffer within the programmable arithmetic processing means for storage of the image data, the programmable arithmetic processing means comprising a first set of local buffers and a second set of local buffer, each buffer in the first set of local buffers alternately used for fetching input image data and each buffer in the second set of local buffers alternately used for storing output image data.

* * * * *